(12) United States Patent
Chae

(10) Patent No.: US 12,118,067 B2
(45) Date of Patent: Oct. 15, 2024

(54) AUTHENTICATION SYSTEM, AUTHENTICATION TERMINAL, USER TERMINAL, AUTHENTICATION METHOD, AND PROGRAM

(71) Applicant: Rakuten Group, Inc., Tokyo (JP)

(72) Inventor: Yeongnam Chae, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 182 days.

(21) Appl. No.: 17/058,374

(22) PCT Filed: Apr. 10, 2019

(86) PCT No.: PCT/JP2019/015637
§ 371 (c)(1),
(2) Date: Nov. 24, 2020

(87) PCT Pub. No.: WO2020/208745
PCT Pub. Date: Oct. 15, 2020

(65) Prior Publication Data
US 2022/0027443 A1    Jan. 27, 2022

(51) Int. Cl.
*G06F 21/00* (2013.01)
*G06F 21/32* (2013.01)

(52) U.S. Cl.
CPC .................................. *G06F 21/32* (2013.01)

(58) Field of Classification Search
None
See application file for complete search history.

(56) References Cited

U.S. PATENT DOCUMENTS

| 8,824,749 B2 * | 9/2014 | Leyvand | G06F 21/32 382/104 |
| 8,935,769 B2 * | 1/2015 | Hessler | H04L 63/0869 713/171 |
| 9,514,295 B2 * | 12/2016 | Channabasappa | G06F 21/35 |
| 9,934,373 B1 * | 4/2018 | Ziraknejad | H04L 63/0861 |

(Continued)

FOREIGN PATENT DOCUMENTS

| CN | 109359548 A | 2/2019 |
| JP | 2002-368869 A | 12/2002 |

(Continued)

OTHER PUBLICATIONS

Extended European Search Report dated Nov. 22, 2021 in European Application No. 19924283.5.

(Continued)

*Primary Examiner* — Maung T Lwin
(74) *Attorney, Agent, or Firm* — Sughrue Mion, PLLC

(57) ABSTRACT

Authentication means (102) of an authentication system (S) performs authentication based on authentication information acquired by using an authentication terminal (30) and authentication information registered in storage means (100) in association with identification information on a user in a vicinity of the authentication terminal (30). Possibility determination means (103) determines, when there are a plurality of users in the vicinity of the authentication terminal (30), whether there is a possibility of one user being authenticated as another user. Restriction means (104) restricts successful authentication when it is determined that there is the possibility.

14 Claims, 17 Drawing Sheets

(56) References Cited

U.S. PATENT DOCUMENTS

| | | | |
|---|---|---|---|
| 2007/0260883 A1 | 11/2007 | Giobbi et al. | |
| 2014/0096215 A1* | 4/2014 | Hessler | H04W 12/06 |
| | | | 726/7 |
| 2014/0162598 A1* | 6/2014 | Villa-Real | G07F 7/0886 |
| | | | 455/411 |
| 2015/0082421 A1* | 3/2015 | Flowers | G06F 21/88 |
| | | | 726/16 |
| 2015/0341331 A1* | 11/2015 | Weksler | H04L 63/08 |
| | | | 726/4 |
| 2015/0358790 A1* | 12/2015 | Nasserbakht | G06F 21/32 |
| | | | 726/19 |
| 2018/0204204 A1* | 7/2018 | Giraudo | G06Q 20/1085 |
| 2018/0375858 A1 | 12/2018 | Watanabe | |
| 2019/0139342 A1* | 5/2019 | Shin | G07C 9/00904 |
| 2019/0164156 A1* | 5/2019 | Lindemann | G06Q 20/4016 |
| 2020/0143022 A1* | 5/2020 | Frost | H04L 63/0869 |
| 2020/0218793 A1* | 7/2020 | Storm | G06V 10/82 |

FOREIGN PATENT DOCUMENTS

| | | |
|---|---|---|
| JP | 2006-039841 A | 2/2006 |
| JP | 2006-135727 A | 5/2006 |
| JP | 2010-108112 A | 5/2010 |
| JP | 2012-028985 A | 12/2012 |
| JP | 2019-008487 A | 1/2019 |
| JP | 6467559 B2 | 2/2019 |
| KR | 10-2015-0134298 A | 12/2015 |
| WO | 2016/010616 A1 | 1/2016 |

OTHER PUBLICATIONS

Communication dated Feb. 4, 2021 from the Taiwanese Patent Office in Application No. 109108761.

Communication dated Dec. 8, 2020, from the Japanese Patent Office in Application No. 2020-148531.

European Communication issued Aug. 22, 2023 in Application No. 19 924 283.5.

International Search Report of PCT/JP2019/015637 dated Jul. 16, 2019 [PCT/ISA/210].

Japanese Office Action of JP2020-511841 dated Jun. 2, 2020.

English translation of International Search Report of PCT/JP2019/015638 dated Jun. 18, 2019 [PCT/ISA/210].

* cited by examiner

FIG.4
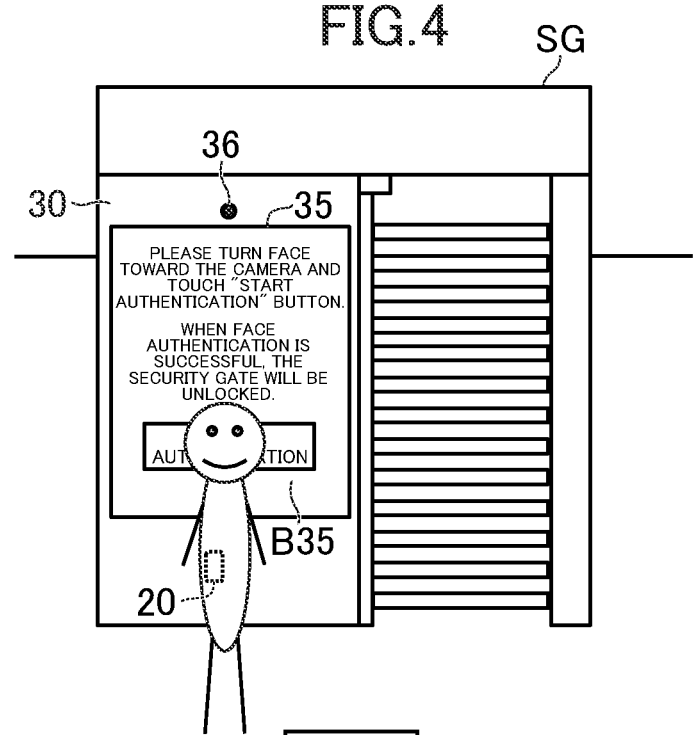
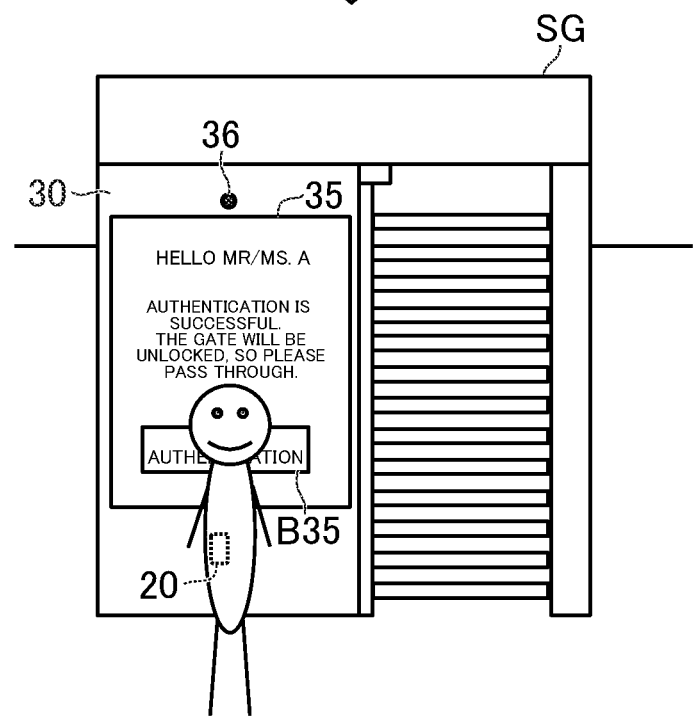

FIG.6
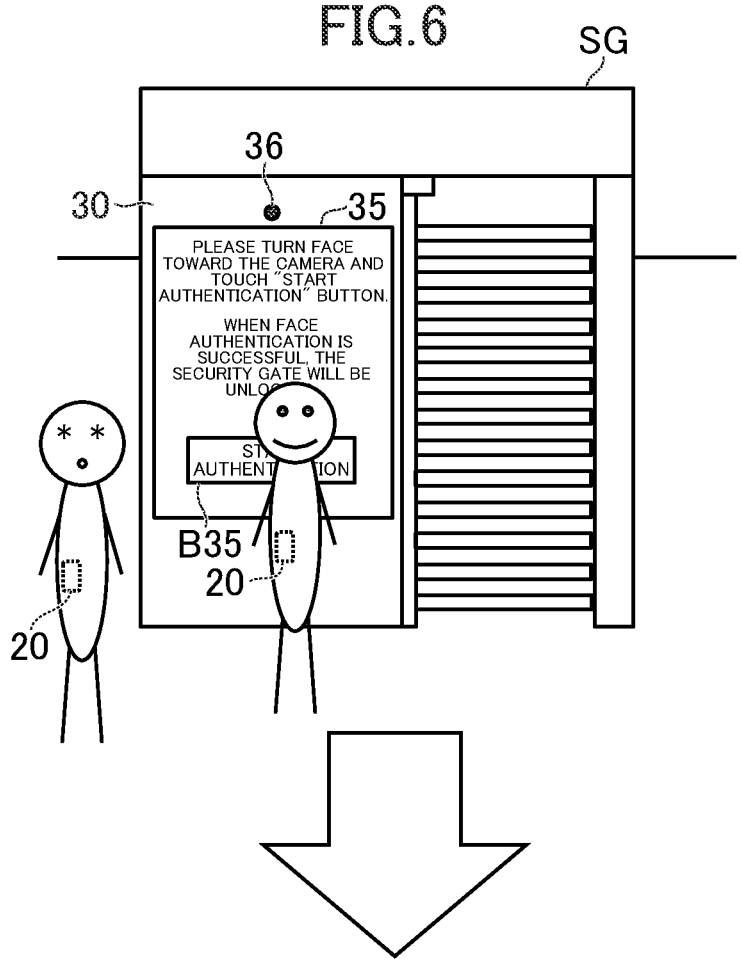
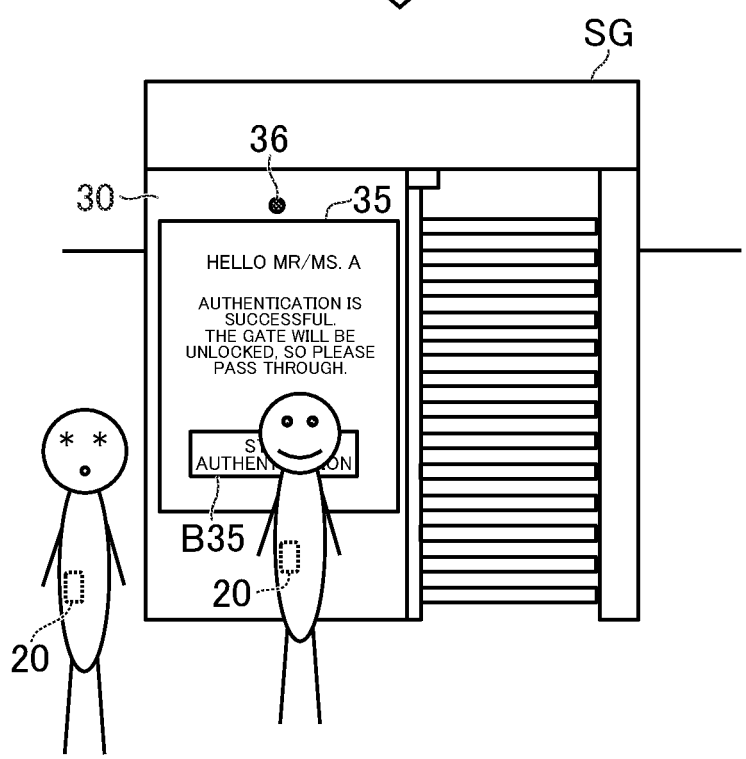

FIG.8

| USER ID | NAME | PASSWORD | FACE PHOTOGRAPH | FEATURE AMOUNT OF FACE |
|---------|------|----------|-----------------|------------------------|
| u00001 | A | ********* | aaa.jpg | (a1,a2,a3,·····) |
| u00002 | X | ******* | xxx.jpg | (x1,x2,x3,·····) |
| u00003 | Y | ********* | yyy.jpg | (y1,y2,y3,·····) |
| ... | ... | ... | ... | ... |

| AUTHENTICATION TERMINAL ID | AUTHENTICATION TERMINAL NAME | AUTHENTICATION TERMINAL POSITION INFORMATION |
|---|---|---|
| a00001 | TOKYO BRANCH OFFICE | (35.689418,139.727234) |
| a00002 | OSAKA BRANCH OFFICE | (34.696228,135.513977) |
| a00003 | HAKATA BRANCH OFFICE | (33.581211,130.391692) |
| ⋮ | ⋮ | ⋮ |

| AUTHENTICATION TERMINAL ID | USER ID | WIRELESS COMMUNICATION ID |
|---|---|---|
| a00001 | u00001 | w01320 |
|  | u00055 | w00891 |
| a00002 | – | – |
| a00003 | u00012 | w07200 |
|  | u00006 | w10892 |
|  | u00032 | w04721 |
| ... | ... | ... |

| WIRELESS COMMUNICATION ID | DISTANCE |
|---|---|
| w01320 | 0.5m |
| w00891 | 0.9m |

L3

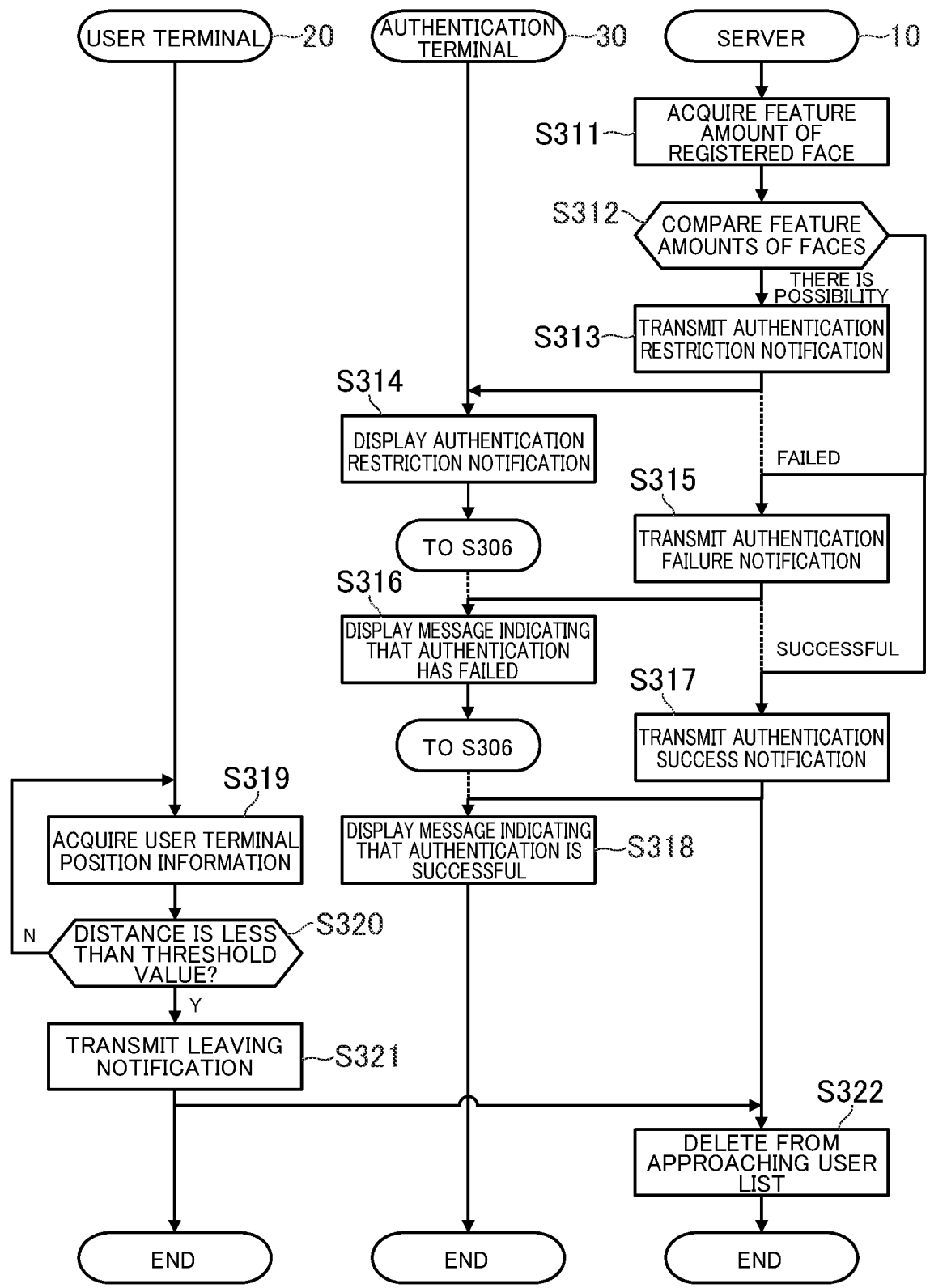

AUTHENTICATION SYSTEM, AUTHENTICATION TERMINAL, USER TERMINAL, AUTHENTICATION METHOD, AND PROGRAM

CROSS REFERENCE TO RELATED APPLICATIONS

This application is a National Stage of International Application No. PCT/JP2019/015637 filed on Apr. 10, 2019.

TECHNICAL FIELD

The present invention relates to an authentication system, an authentication terminal, a user terminal, an authentication method, and a program.

BACKGROUND ART

There has hitherto been known a technology for performing authentication of a user who has approached an authentication terminal. For example, in Patent Literature 1, there is described a technology in which wireless authentication is performed between a user terminal and a printer when a user has approached the printer, and when the wireless authentication is successful, biometric authentication is executed to permit use of the printer. Further, for example, in Patent Literature 2, there is described a technology in which, in a case in which a plurality of mobile terminals are present around a vending machine, when a user inputs authentication information to the vending machine, the vending machine transmits the authentication information to each mobile terminal, and authentication is performed in the mobile terminal.

CITATION LIST

Patent Literature

[PTL 1] JP 2019-008487 A
[PTL 2] JP 6467559 B2

SUMMARY OF INVENTION

Technical Problem

However, in the technology of Patent Literature 1, for example, in a case in which a certain user A uses a printer, when a user B having similar biometric authentication information on a face or another feature is near the printer, there is a possibility that wireless authentication and biometric authentication are both successful. For example, when the wireless authentication of the user B is successful without the user B noticing, there is a possibility that the biometric authentication information on the user B is used for comparison during authentication and the user A uses the printer by impersonating the user B.

This point is the same in Patent Literature 2. In a case in which a certain user X purchases a product at a vending machine, when there is a user Y having similar biological authentication information on a face or another feature in the vicinity, there is a possibility that face authentication is successful in the terminal of the user Y even when a face photograph of the user X is photographed. That is, there is the possibility that the terminal of the user Y and the vending machine communicate to each other without the user Y noticing, face authentication is successful in the terminal of the user Y, and the user X can use a card number of the user Y by impersonating the user Y to purchase a product.

One embodiment of the present invention has been made in view of the above-mentioned issues. It is an object of the one embodiment of the present invention to provide an authentication system, an authentication terminal, a user terminal, an authentication method, and a program, which are capable of enhancing security by preventing impersonation.

Solution to Problem

In order to solve the above-mentioned issues, according to one embodiment of the present invention, there is provided an authentication system including: authentication means for performing authentication based on authentication information acquired by using an authentication terminal and authentication information registered in storage means in association with identification information on a user in a vicinity of the authentication terminal; possibility determination means for determining, when there are a plurality of users in the vicinity of the authentication terminal, whether there is a possibility of one user being authenticated as another user; and restriction means for restricting successful authentication when it is determined that there is the possibility.

According to one embodiment of the present invention, there is provided an authentication terminal described above or described below, the authentication terminal including: authentication information acquisition means for acquiring authentication information on a user in a vicinity of the authentication terminal; and transmission means for transmitting the acquired authentication information.

According to one embodiment of the present invention, there is provided a user terminal including: first acquisition means for acquiring authentication terminal position information on a position of the authentication terminal described above or described below; second acquisition means for acquiring user terminal position information on a position of the user terminal; approach determination means for determining, based on the authentication terminal position information and the user terminal position information, whether the user terminal has approached the authentication terminal; and transmission means for transmitting the identification information when it is determined that the user terminal has approached the authentication terminal.

According to one embodiment of the present invention, there is provided an authentication method including the steps of: performing authentication based on authentication information acquired by using an authentication terminal and authentication information registered in storage means in association with identification information on a user in a vicinity of the authentication terminal; determining, when there are a plurality of users in the vicinity of the authentication terminal, whether there is a possibility of one user being authenticated as another user; and restricting successful authentication when it is determined that there is the possibility.

According to one embodiment of the present invention, there is provided a program for causing an authentication terminal described above or described below to function as: authentication information acquisition means for acquiring authentication information on a user in a vicinity of the authentication terminal; and transmission means for transmitting the acquired authentication information.

According to one embodiment of the present invention, there is provided a program for causing a computer to function as: first acquisition means for acquiring authentication terminal position information on a position of the authentication terminal described above or described below; second acquisition means for acquiring user terminal position information on a position of the user terminal; approach determination means for determining, based on the authentication terminal position information and the user terminal position information, whether the user terminal has approached the authentication terminal; and transmission means for transmitting the identification information when it is determined that the user terminal has approached the authentication terminal.

According to one embodiment of the present invention, the restriction means is configured to permit the successful authentication when, after it is determined that there is the possibility and the successful authentication has been restricted, it is no longer determined that there is the possibility.

According to one embodiment of the present invention, the authentication means is configured to perform the authentication by determining whether the acquired authentication information matches or is similar to the registered authentication information, and the possibility determination means is configured to determine that there is the possibility when there are a plurality of pieces of the registered authentication information matching or similar to the acquired authentication information.

According to one embodiment of the present invention, the authentication system further includes notification means for issuing a predetermined notification to at least one of the plurality of users when it is determined that there is the possibility.

According to one embodiment of the present invention, the authentication system further includes identification information acquisition means for acquiring the identification information from a user terminal that has approached the authentication terminal, and the authentication means is configured to acquire the registered authentication information to perform the authentication based on the identification information acquired from the user terminal.

According to one embodiment of the present invention, the authentication system further includes exclusion means for excluding the registered authentication information such that the registered authentication information is not used in the authentication when the user terminal that has approached the authentication terminal moves away from the authentication terminal.

According to one embodiment of the present invention, the authentication system includes the user terminal, and the user terminal includes: first acquisition means for acquiring authentication terminal position information on a position of the authentication terminal; second acquisition means for acquiring user terminal position information on a position of the user terminal; approach determination means for determining, based on the authentication terminal position information and the user terminal position information, whether the user terminal has approached the authentication terminal; and identification information transmission means for transmitting the identification information when it is determined that the user terminal has approached the authentication terminal.

According to one embodiment of the present invention, the user terminal further includes: leaving determination means for determining, based on the authentication terminal position information and the user terminal position information, whether the user terminal has moved away from the authentication terminal; and notification transmission means for transmitting a predetermined notification when it is determined that the user terminal has moved away from the authentication terminal, and the authentication system further includes exclusion means for excluding, when the predetermined notification is received, the registered authentication information such that the registered authentication information is not used in the authentication.

According to one embodiment of the present invention, the authentication system further includes communication content determination means for determining, based on communication content of short-range wireless communication performed between the authentication terminal and a user terminal, whether there is a user in the vicinity of the authentication terminal, and the possibility determination means is configured to determine whether there is the possibility when it is determined that there are a plurality of users in the vicinity of the authentication terminal based on the communication content of the short-range wireless communication.

According to one embodiment of the present invention, in the short-range wireless communication, a distance between the authentication terminal and the user terminal is measurable, and the communication content determination means is configured to determine whether there is a user in the vicinity of the authentication terminal based on the distance measured by the short-range wireless communication.

According to one embodiment of the present invention, the possibility determination means is configured to determine whether there is the possibility by mutually comparing the authentication information registered for each of the plurality of users in the vicinity of the authentication terminal.

According to one embodiment of the present invention, the possibility determination means is configured to determine whether there is the possibility by mutually comparing authentication information on each of the plurality of users in the vicinity of the authentication terminal acquired by using the authentication terminal.

According to one embodiment of the present invention, the authentication means is configured to perform the authentication based on biometric authentication information acquired by using the authentication terminal and the registered biometric authentication information.

According to one embodiment of the present invention, the restriction means is configured to restrict provision of a service that uses the authentication terminal by restricting the successful authentication when it is determined by the determination means that there is the possibility.

Advantageous Effects of Invention

According to one embodiment of the present invention, the security can be enhanced by preventing impersonation.

BRIEF DESCRIPTION OF DRAWINGS

FIG. 4 is a diagram for illustrating a situation in which authentication by the authentication terminal is successful.

FIG. 6 is a diagram for illustrating a case in which a plurality of users not having a similar face to each other are in the authentication-feasible area.

FIG. 8 is a table for showing a data storage example of a user database.

FIG. 9 is a table for showing a data storage example of an authentication terminal list.

FIG. 10 is a table for showing a data storage example of an approaching user list.

FIG. 11 is a table for showing a data storage example of a communication partner list.

FIG. 17 is a flowchart for illustrating a case in which the second wireless communication unit uses Wi-Fi.

DESCRIPTION OF EMBODIMENTS

1. First Embodiment

There is now described an example of an authentication system according to a first embodiment of the present invention (hereinafter referred to as "first embodiment").

1-1. Overall Configuration of Authentication System

Figure 1:
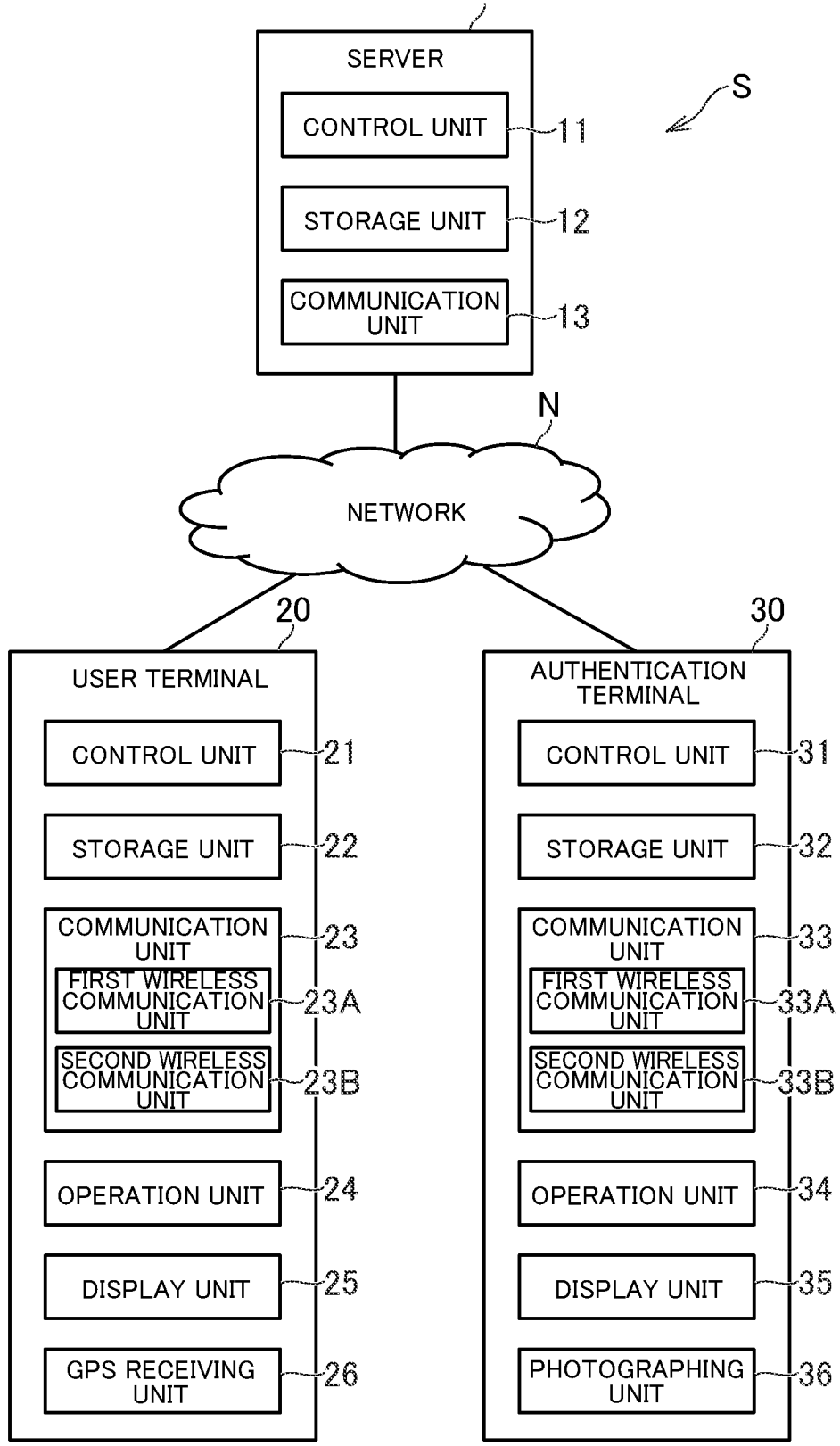
FIG. 1 is a diagram for illustrating an overall configuration of an authentication system according to a first embodiment of the present invention.

FIG. 1 is a diagram for illustrating an overall configuration of the authentication system according to the first embodiment. As illustrated in FIG. 1, an authentication system S includes a server 10, a user terminal 20, and an authentication terminal 30, each of which can be connected to a network N, for example, the Internet.

In FIG. 1, one server 10, one user terminal 20, and one authentication terminal 30 are illustrated in order to simplify the drawing, but there may be a plurality of those parts. In this embodiment, each of a plurality of users uses the user terminal 20, and there are a plurality of user terminals 20. Further, the authentication terminal 30 is arranged at each of a plurality of places, and there are a plurality of authentication terminals 30.

The server 10 is a server computer. The server 10 includes a control unit 11, a storage unit 12, and a communication unit 13. The control unit 11 includes at least one processor. The control unit 11 executes processing in accordance with programs and data stored in the storage unit 12. The storage unit 12 includes a main memory unit and an auxiliary memory unit. For example, the main memory unit is a volatile memory, for example, a RAM, and the auxiliary memory unit is a non-volatile memory such as a ROM, an EEPROM, a flash memory, or a hard disk drive. The communication unit 13 is a communication interface for wired communication or wireless communication, and performs data communication via the network N.

The user terminal 20 is a computer to be operated by a user. The user terminal 20 is a portable terminal, which is, for example, a cell phone (including smartphones), a portable information terminal (including tablet computers and wearable terminals), or a personal computer. In this embodiment, the user terminal 20 includes a control unit 21, a storage unit 22, a communication unit 23, an operation unit 24, a display unit 25, and a GPS receiving unit 26. The physical configuration of each of the control unit 21, the storage unit 22, and the communication unit 23 may be the same as those of the control unit 11, the storage unit 12, and the communication unit 13, respectively.

In this embodiment, the communication unit 23 includes a plurality of communication interfaces, and includes, for example, a first wireless communication unit 23A and a second wireless communication unit 23B. The first wireless communication unit 23A and the second wireless communication unit 23B are communication interfaces having a communication standard different from each other. The communication standard itself may be any communication standard, and usable communication standards include a communication standard for cell phones, Bluetooth (trademark), Wi-Fi (an example of a so-called wireless LAN), Wi-Fi Direct (trademark), and infrared communication.

In this embodiment, there is described an example in which the first wireless communication unit 23A uses a communication standard for cell phones or Wi-Fi, and the second wireless communication unit 23B uses Bluetooth (trademark). It is assumed that Bluetooth (trademark) includes an extended specification, for example, BLE. The number of communication interfaces included in the communication unit 23 is not limited to two, and may be only one, or may be three or more.

The operation unit 24 is an input device, and is, for example, a pointing device such as a touch panel and a mouse, a keyboard, or a button. The operation unit 24 transmits details of operation to the control unit 21. The display unit 25 is, for example, a liquid crystal display unit or an organic EL display unit. The display unit 25 displays an image in accordance with an instruction of the control unit 21.

The GPS receiving unit 26 is an example of a receiving unit configured to receive signals from satellites. A GNSS (for example, GLONASS, Galileo, or QZSS) other than GPS may be used, and the receiving unit may include a receiver supporting the GNSS to be used. For example, the GPS receiving unit 26 includes an antenna configured to receive signals, and detects position information, time information, and the like based on the received signals.

The authentication terminal 30 is a computer to be used for authentication. For example, the authentication terminal 30 is a cell phone, a portable information terminal, or a personal computer. The authentication terminal 30 may be a portable terminal or a stationary terminal. In this embodiment, the authentication terminal 30 includes a control unit 31, a storage unit 32, a communication unit 33, an operation unit 34, a display unit 35, and a photographing unit 36. The physical configuration of each of the control unit 31, the storage unit 32, the communication unit 33, the operation unit 34, and the display unit 35 may be the same as those of the control unit 21, the storage unit 22, the communication unit 23, the operation unit 24, and the display unit 25, respectively.

In this embodiment, there is described a case in which the communication unit 33 includes a first wireless communication unit 33A having the same communication standard as that of the first wireless communication unit 23A, and a second wireless communication unit 33B having the same communication standard as that of the second wireless communication unit 23B. It should be noted that the first wireless communication unit 33A may have a communication standard different from that of the first wireless communication unit 23A, and the second wireless communication unit 33B may have a communication standard different from that of the second wireless communication unit 23B. The number of communication interfaces included in the communication unit 33 and the number of communication interfaces included in the communication unit 23 may be the same or different.

The photographing unit 36 includes at least one camera. For example, the photographing unit 36 includes an image pickup element such as a CCD image sensor or a CMOS image sensor, and records an image picked up by the image pickup element as digital data. The image may be a still image or a moving image picked up continuously at a predetermined frame rate.

Programs and data to be described as being stored into the storage units 12, 22, and 32 may be supplied thereto via the network N. Further, the respective hardware configurations of the computers described above are not limited to the above-mentioned examples, and various types of hardware can be applied thereto. For example, the hardware configuration may include a reading unit (e.g., an optical disc drive or a memory card slot) configured to read a computer-readable information storage medium, or an input/output unit (e.g., a USB port) configured to input and output data to/from an external device. For example, the program and the data stored in the information storage medium may be supplied to each of the computers through intermediation of the reading unit or the input/output unit.

1-2. Outline of Authentication System

The authentication system S is configured to execute authentication in order to confirm the validity of the user in a suitable situation. The authentication is an action of confirming whether or not the user has a predetermined qualification, and may be referred to as "other-party authentication" or "personal authentication". The authentication system S can execute various types of authentication. For example, the authentication system S can execute biometric authentication, passcode authentication, password authentication, electronic stamp authentication, or countersign authentication.

Biometric authentication is an authentication method that uses a physical feature or behavioral characteristic of a human. Examples of biometric authentication that uses a physical feature includes face authentication, fingerprint authentication, DNA authentication, palm authentication, retina authentication, iris authentication, vein authentication, and voice authentication. Examples of biometric authentication that uses a behavioral feature includes handwriting authentication, key stroke authentication, lip movement authentication, eye blinking authentication, and gait authentication.

In this embodiment, processing of the authentication system S is described by using a situation in which the user passes through a security gate as an example. The authentication system S is applicable to various situations, as described in modification examples of the present invention later, and the situations to which the authentication system S is applied are not limited to the example of this embodiment.

Figure 2:
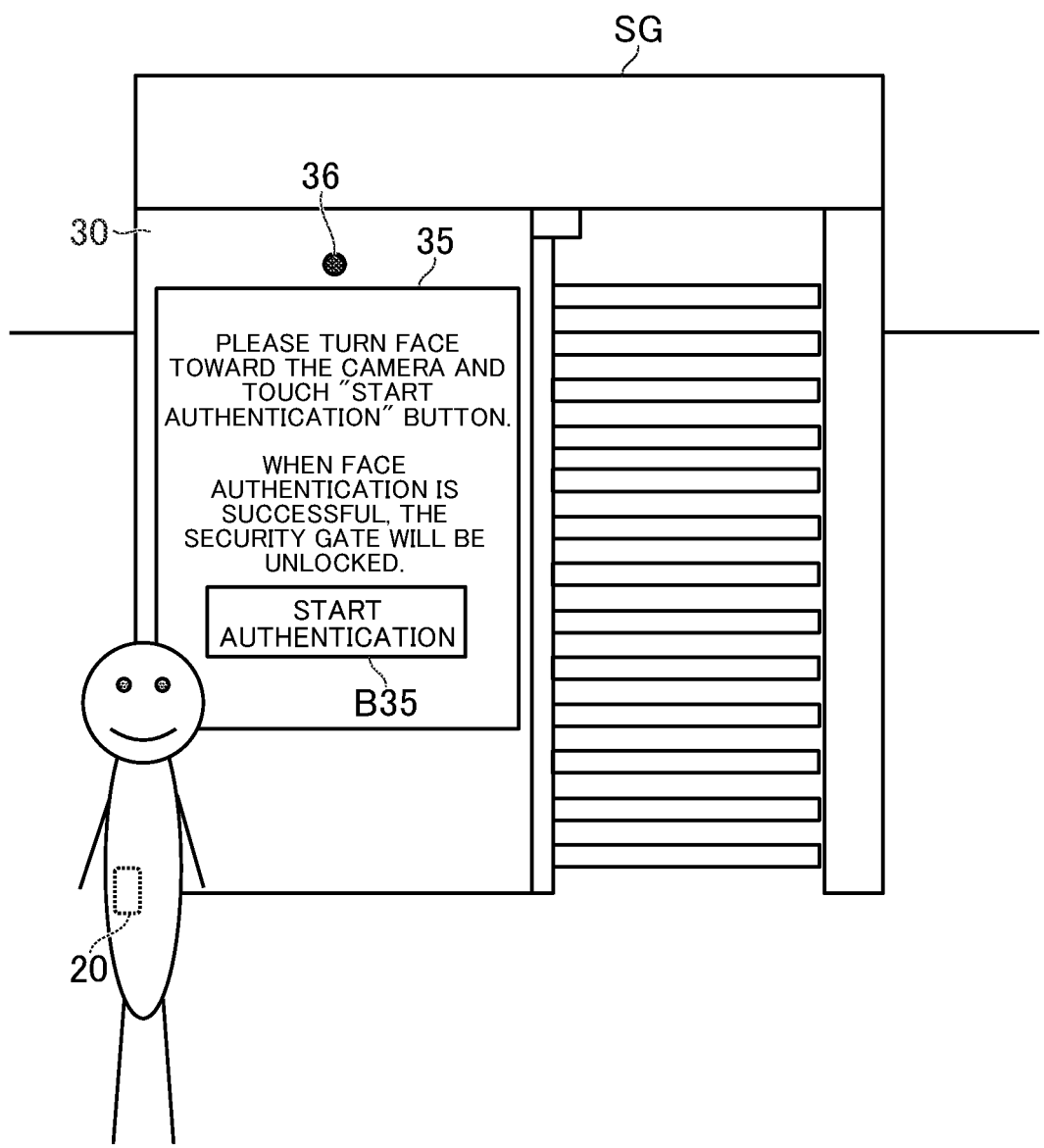
FIG. 2 is a diagram for illustrating an example of a situation in which the authentication system is used.

FIG. 2 is a diagram for illustrating an example of a situation in which the authentication system S is used. As illustrated in FIG. 2, a security gate SG includes a rotatable door, and is connected to the authentication terminal 30. The door of the security gate SG is locked by a lock mechanism, and is unlocked when user authentication is successful. When the lock is unlocked, the user can push the door to pass through the door. The door is locked again when the door is rotated by a predetermined angle. The door may be an opening and closing type of door, and the opening and closing may be controlled by an electronic lock.

For example, the security gate SG may be arranged at any facility, such as at a company for which the user works or at a public facility, and only those who are qualified to enter are allowed to pass through the security gate SG. In this embodiment, the security gate SG is arranged at each of a plurality of facilities. Therefore, the authentication system S includes a plurality of authentication terminals 30, and a security gate SG and an authentication terminal 30 are arranged at each facility.

In general, a security gate using a card key is the mainstream, but in the case of a security gate, a user is required to take out the card key and swipe the card key over a card reader, which takes time and effort. In addition, there is also a possibility that when the user loses a card key, a third party who obtained the card key may impersonate the user and pass through the security gate.

In this regard, when biometric authentication, for example, face authentication, is used, the time and effort involved in taking out the card key can be eliminated, and there is no risk of losing the card key. However, biometric authentication does not require a complete match of faces and the like, and success or failure is determined based on similarity. Therefore, for example, there is a possibility that another person having a similar face to the user may impersonate the user and pass through the security gate.

Therefore, the authentication system S of this embodiment unlocks the security gate SG when two conditions are satisfied, namely, a condition that a user has approached the authentication terminal 30 and a condition that the biometric authentication using the authentication terminal 30 is successful. It is not possible for a malicious third party to pass through the security gate SG by impersonating another person because even if the third party tries to impersonate another person having a similar face, the third party does not have the user terminal 20 of the another person.

Figure 3:
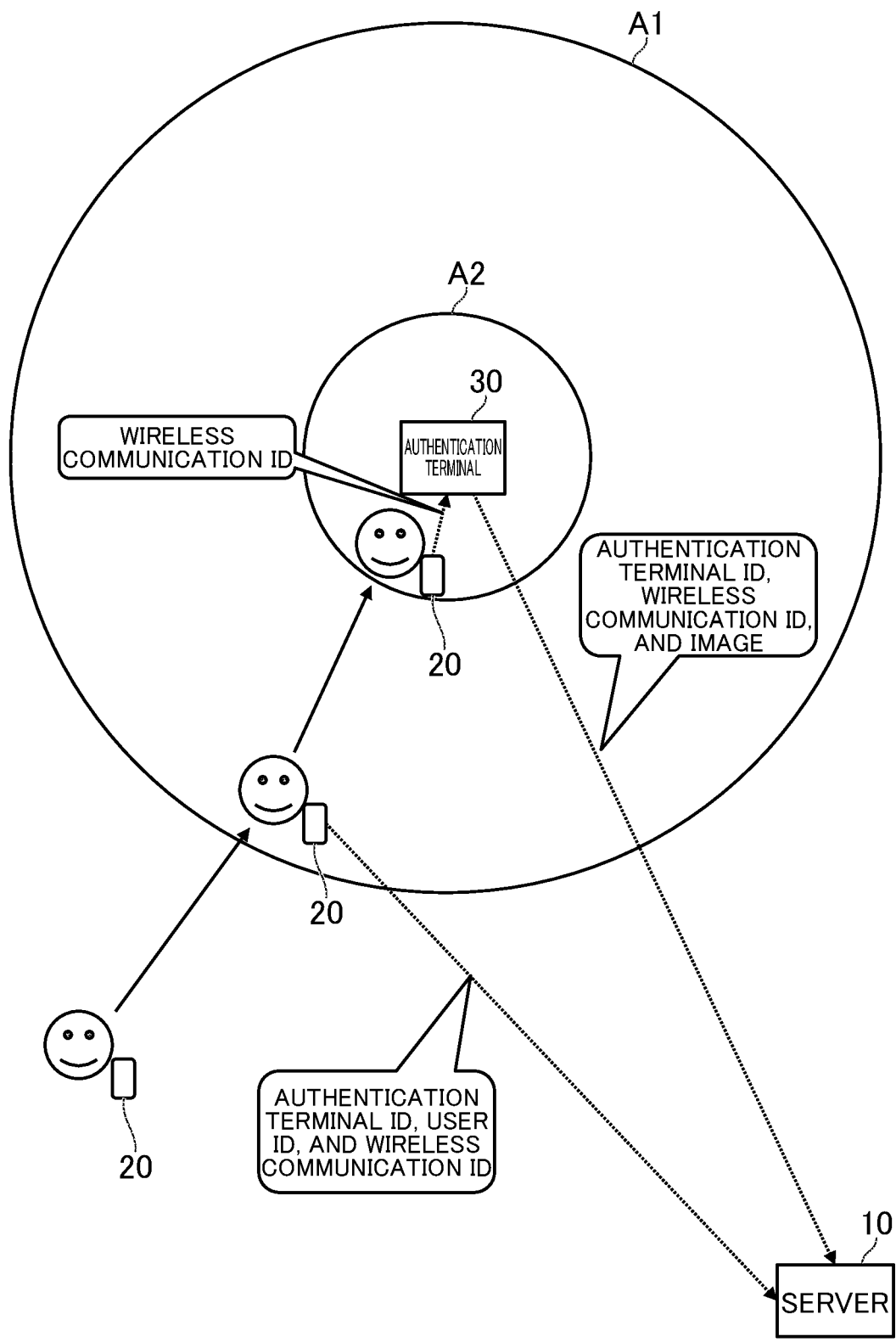
FIG. 3 is a diagram for illustrating a situation in which a user approaches an authentication terminal.

FIG. 3 is a diagram for illustrating a situation in which the user approaches the authentication terminal 30. In FIG. 3, the server 10 is also illustrated, but the server 10 is actually arranged at a place away from the user and the authentication terminal 30. As illustrated in FIG. 3, a communicable area A1 and an authentication-feasible area A2 are set around the authentication terminal 30. The communicable area A1 and the authentication-feasible area A2 are each illustrated as being circular, but those areas may have any shape and size, and may be, for example, semicircular, elliptical, or polygonal.

The communicable area A1 is an area indicating a communication range of the second wireless communication unit 33B of the authentication terminal 30. The communicable area A1 differs depending on the communication standard and a communication environment to be used, and is, for example, from about 3 meters to about 5 meters. When the user terminal 20 moves into the communicable area A1, direct communication between the user terminal 20 and the authentication terminal 30 becomes possible. However, in this embodiment, it is assumed that communication is not performed until pairing is executed, and only pre-pairing stage communication is performed.

The authentication-feasible area A2 is an area in which authentication is permitted. The authentication-feasible area A2 is smaller than the communicable area A1. In other words, the authentication-feasible area A2 is included in the communicable area A1, and the edge of the authentication-feasible area A2 is closer to the authentication terminal 30 than to the edge of the communicable area A1. For example, the authentication-feasible area A2 is about 1 meter.

In this embodiment, the user terminal 20 stores latitude and longitude information or coordinate information on the authentication terminal 30. Therefore, the user terminal 20 can detect that a user has moved into the communicable area A1 based on the current position detected by the GPS receiving unit 26.

For example, it is assumed that a user has approached the authentication terminal 30 while keeping the user terminal 20 in his or her pocket or bag. As illustrated in FIG. 3, when the user terminal 20 detects that the user has entered the communicable area A1, the user terminal 20 uses the first wireless communication unit 23A to transmit to the server 10 a notification indicating that the user has approached the authentication terminal 30.

As illustrated in FIG. 3, the notification includes an authentication terminal ID for identifying the authentication terminal 30 that the user has approached, a user ID for identifying the user, and a wireless communication ID for identifying the second wireless communication unit 23B. Through receiving those pieces of information, the server 10 detects that the user has entered the communicable area A1.

When the user enters the communicable area A1, direct communication is enabled between the second wireless communication unit 23B of the user terminal 20 and the second wireless communication unit 33B of the authentication terminal 30. However, when pairing is attempted at this time, the user is required to take out the user terminal 20 from his or her pocket or bag and perform an operation for pairing. Therefore, in this embodiment, in order to reduce the work required by the user, pairing is not performed.

When the user comes even closer to the authentication terminal 30 and enters the authentication-feasible area A2, authentication can be started. In this embodiment, a button B35 for starting authentication is displayed on the display unit 35 of the authentication terminal 30. The user touches the button B35 to cause the photographing unit 36 to photograph the face of the user and start authentication.

When the user selects the button B35, the authentication terminal 30 photographs the face of the user by using the photographing unit 36. Further, the authentication terminal 30 uses the second wireless communication unit 33B to issue a request to the user terminal 20 for the wireless communication ID of the second wireless communication unit 23B. This request is transmitted by pre-pairing stage communication, and is transmitted by using an advertising packet, for example.

When the request is received by the user terminal 20, the user terminal 20 transmits the wireless communication ID of the second wireless communication unit 23B to the authentication terminal 30. The information that can be transmitted by using an advertising packet or the like is determined in advance, and in this example, the wireless communication ID is set to be transmitted. For this reason, in this embodiment, the authentication terminal 30 cannot receive the user ID from the user terminal 20.

When the wireless communication ID is received by the authentication terminal 30 from the user terminal 20, the authentication terminal 30 transmits to the server 10 its own authentication terminal ID, the received wireless communication ID, and the image photographed by the photographing unit 36. The details are described later, but in order to identify the user in the authentication-feasible area A2, the authentication terminal 30 measures the distance to the user terminal 20 by scanning a signal strength (received signal strength indication (RSSI)) detected by the second wireless communication unit 33B, and filters only the wireless communication IDs received from the user terminals 20 within a predetermined distance.

When the authentication terminal ID and the wireless communication ID are received by the server 10 from the authentication terminal 30, the server 10 refers to the user ID received in advance from the user terminal 20, the authentication terminal ID, and the wireless communication ID, and identifies the user ID of the user in the authentication-feasible area A2. As described above, the authentication terminal 30 cannot receive the user ID from the user terminal 20, and hence, in order to identify the user ID of the user in the authentication-feasible area A2, the server 10 refers to the authentication terminal ID received from the authentication terminal 30 and the user ID associated with the wireless communication ID.

When the user ID of the user in the authentication-feasible area A2 is identified by the server 10, the server 10 performs authentication based on a feature amount of the face shown in the image received from the authentication terminal 30 and the feature amount of the face registered in advance in association with the identified user ID. When the authentication is successful, the security gate SG is unlocked.

FIG. 4 is a diagram for illustrating a situation in which authentication by the authentication terminal 30 is successful. As illustrated in FIG. 4, when authentication is successful, information, for example, the name of the successfully authenticated user, is displayed on the display unit 35 of the authentication terminal 30 to notify the user that he or she is permitted to pass through the security gate SG. Then, the user passes through the security gate SG.

As described above, in this embodiment, authentication is successful when two conditions are satisfied, namely, the condition that a user has approached the authentication terminal 30 and the condition that the biometric authentication using the authentication terminal 30 is successful. However, even in this case, impersonation may not be prevented when there area plurality of users having similar faces to each other in the vicinity of the authentication terminal 30.

For example, it is assumed that when a user A touches the button B35, there is a user B having a similar face to the user A in the authentication-feasible area A2. In this case, the authentication system S detects that the user A and the user B are both in the authentication-feasible area A2, and therefore there is a possibility that the user A is authenticated as the user B without the user B noticing. As a result, there is a possibility that the user A passes through the security gate SG by impersonating the user B.

Therefore, in the authentication system S of this embodiment, when there are a plurality of users having a similar face to each other in the vicinity of the security gate SG, security is enhanced by restricting successful authentication to prevent impersonation.

Figure 5:
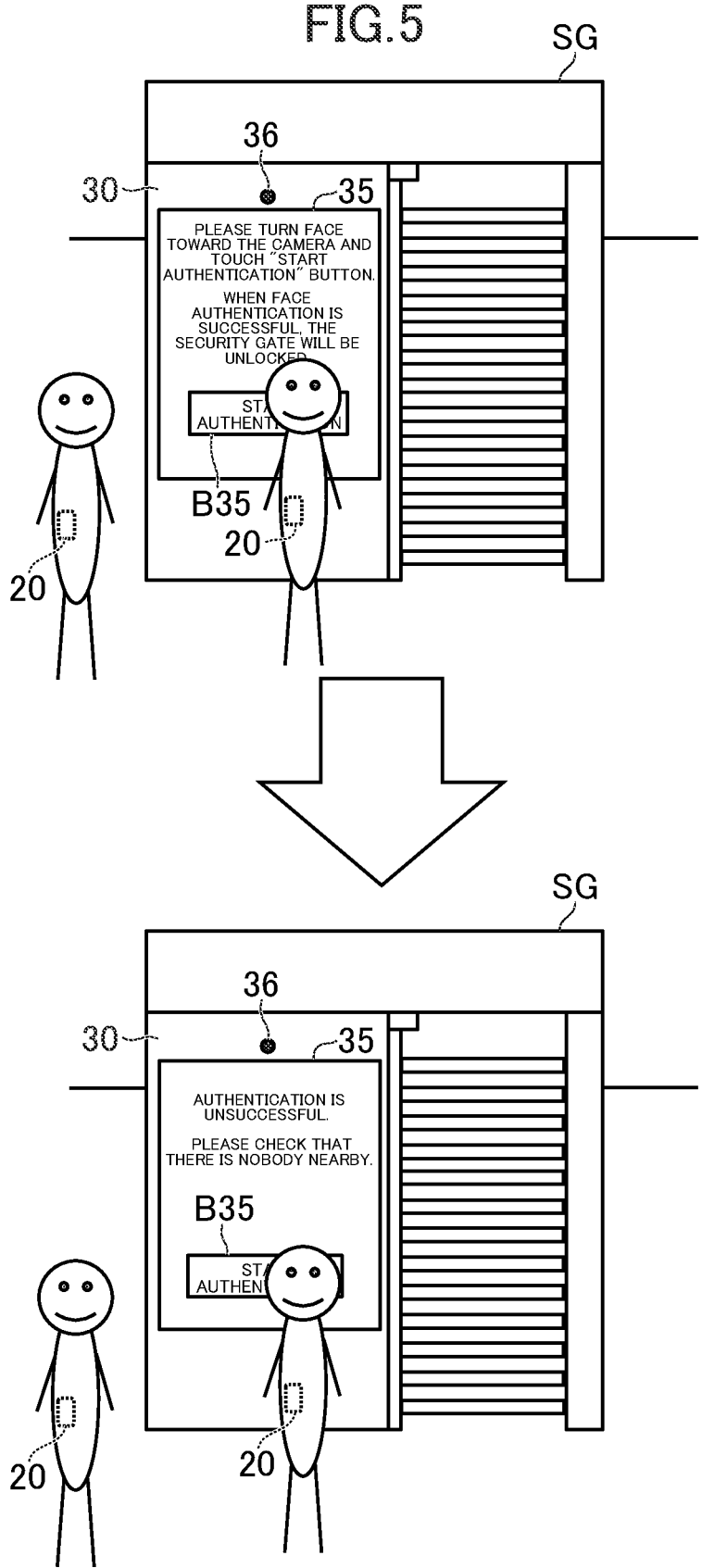
FIG. 5 is a diagram for illustrating a case in which a plurality of users having a similar face to each other are in an authentication-feasible area.

FIG. 5 is a diagram for illustrating a case in which a plurality of users having a similar face to each other are in the authentication-feasible area A2. In this case, there is a possibility that one user may be authenticated as another user, and hence as illustrated in FIG. 5, authentication is not successful, and the authentication system S keeps the security gate SG locked. In this case, a message indicating that authentication is not successful is displayed on the display unit 35 of the authentication terminal 30.

When the message illustrated in FIG. 5 is displayed on the display unit 35, for example, any one of the users urges another nearby user to move away from the security gate SG. When the another user moves away from the security gate SG and leaves the authentication-feasible area A2, the restriction on authentication is released. In this case, authentication is successful as illustrated in FIG. 4, and the security gate SG is unlocked.

FIG. 6 is a diagram for illustrating a case in which a plurality of users not having a similar face to each other are in the authentication-feasible area A2. When the faces are not similar to each other, one user is not authenticated as another user, and hence successful authentication is not restricted in the manner illustrated in FIG. 6. That is, in this embodiment, when a plurality of users are in the authentication-feasible area A2, in place of mandatorily restricting successful authentication, authentication is permitted when there is no possibility of impersonation. In this manner, convenience is enhanced.

In this way, when there are a plurality of users having a similar face to each other in the authentication-feasible area A2, the authentication system. S enhances security by restricting successful authentication to prevent impersonation. The details of this technology are now described.

1-3. Functions to be Implemented in First Embodiment

Figure 7:
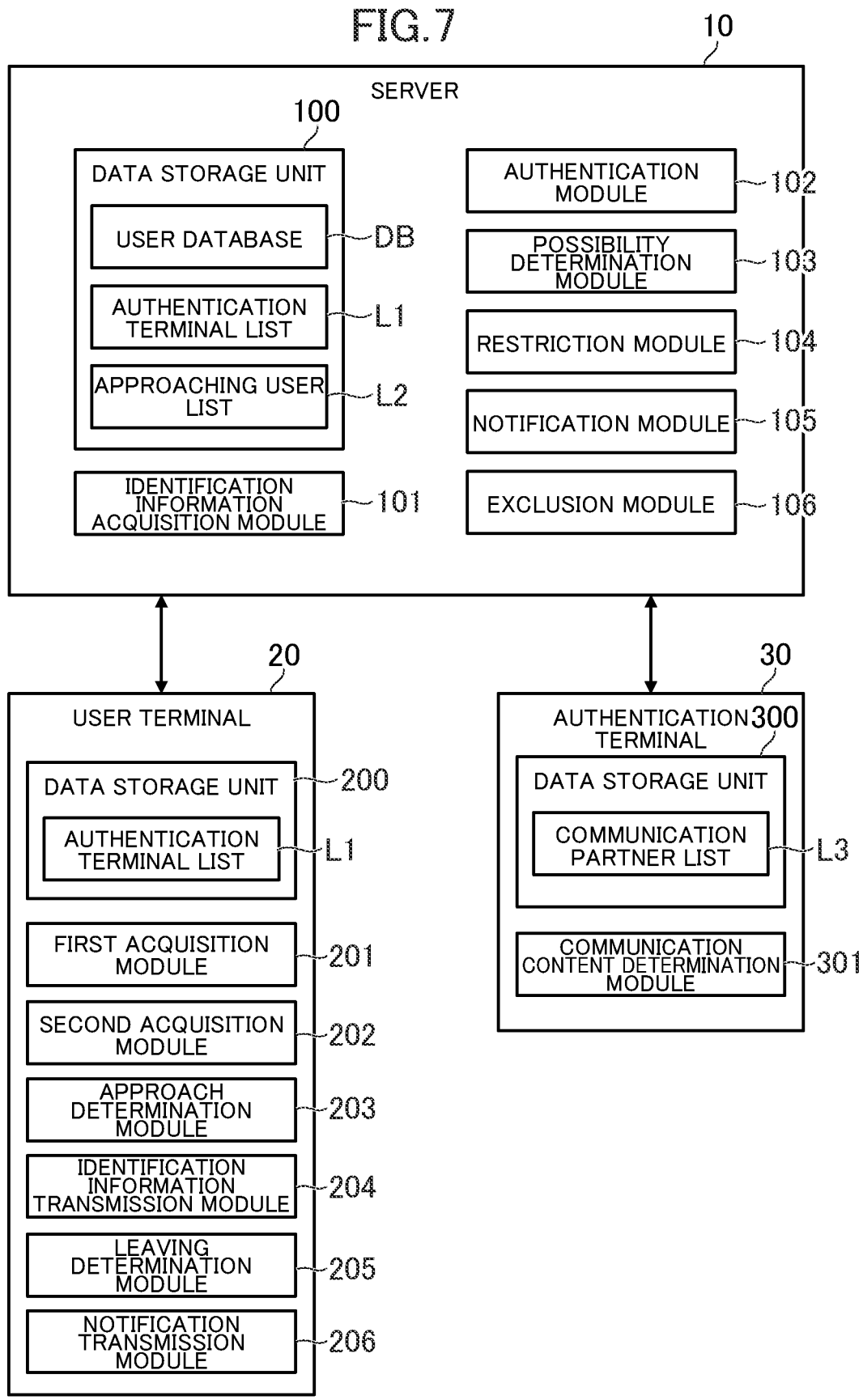
FIG. 7 is a functional block diagram for illustrating an example of functions to be implemented in the first embodiment.

FIG. 7 is a functional block diagram for illustrating an example of functions to be implemented in the first embodiment. In this example, the functions to be implemented by each of the server 10, the user terminal 20, and the authentication terminal 30 are described.

[1-3-1. Functions to be Implemented by Server]

As illustrated in FIG. 7, in the server 10, a data storage unit 100, an identification information acquisition module 101, an authentication module 102, a possibility determination module 103, a restriction module 104, a notification module 105, and an exclusion module 106 are implemented.

[Data Storage Unit]

The data storage unit 100 is mainly implemented by the storage unit 12. The data storage unit 100 is configured to store the data required for executing the processing described in this embodiment. As an example of the data stored in the data storage unit 100, a user database DB, an authentication terminal list L1, and an approaching user list L2 are described.

FIG. 8 is a table for showing a data storage example of the user database DB. As shown in FIG. 8, the user database DB is a database in which various kinds of information on the user are stored. For example, the user database DB stores a user ID, a name of the user, a password, a face photograph, and a feature amount of the face. For example, when the user performs a predetermined use registration in the server 10, a user ID is newly issued, and a new record is created in the user database DB. The record stores the name and password input by the user, the face photograph uploaded by the user, and the feature amount calculated based on the face photograph. The information stored in the user database DB is not limited to the example of FIG. 8, and any information such as contact information and the address of the user may be stored.

The password and the feature amount of the face are a kind of authentication information. The authentication information is information to be referred to during authentication, and a name thereof varies depending on the authentication method. For example, in the case of electronic stamp authentication, a multi-touch pattern of the stamp is the authentication information, and in the case of countersign authentication, the countersign is the authentication information. Each of the password and the feature amount of the face may be used for any purpose. In this embodiment, the password is used in order for the user to apply for a registration of the face photograph or edit registered information, and the feature amount of the face is used in order for the user to pass through the security gate SG. The face photograph may correspond to the authentication information.

The feature amount of the face is information obtained by quantifying a feature of the face, and indicates features such as a relative position, size, or shape of a facial part. In this embodiment, the feature amount of the face indicated by the face photograph is calculated in advance, but the feature amount of the face may be calculated on the spot at the time of authentication. When a plurality of face photographs are to be registered, the feature amount of the face is calculated for each face photograph. Various methods are applicable for the actual face authentication. For example, a method such as principal component analysis, linear discriminant analysis, elastic matching, or hidden Markov model is usable, and the feature amount is only required to be calculated by a calculation expression corresponding to those methods. For example, the feature amount of the face is assumed to be represented by a multi-dimensional vector, but the feature amount of the face may be represented in another form, such as an array or a single numerical value.

FIG. 9 is a table for showing a data storage example of the authentication terminal list L1. As shown in FIG. 9, the authentication terminal list L1 is a list relating to the plurality of authentication terminals 30 included in the authentication system S. For example, the authentication terminal list L1 stores an authentication terminal ID for uniquely identifying the authentication terminal 30, an authentication terminal name indicating the name of the authentication terminal 30, and authentication terminal position information.

The authentication terminal position information is information on the position of the authentication terminal 30. The authentication terminal position information may be any information capable of identifying the position of the authentication terminal 30, and is, for example, latitude and longitude information, coordinate information, address information, access point information, beacon information, or cell phone base station information. The authentication terminal position information may also indicate an area in which the authentication terminal 30 is arranged. The area is a rough position of the authentication terminal 30, and may be, for example, a city name, an area, a postal code, a station name, an airport name, or a stop name, or an area on a map or coordinates on which latitude and longitude information or coordinate information is plotted.

The authentication terminal position information may be input by an administrator of the authentication system S, or may be acquired from the authentication terminal 30. For example, when the authentication terminal 30 includes a GPS receiving unit, authentication terminal position information acquired by the authentication terminal 30 using the GPS receiving unit is registered in the authentication terminal list L1. As another example, authentication terminal position information acquired by the communication unit 33 of the authentication terminal 30 is registered in the authentication terminal list L1. As yet another example, authentication terminal position information input from the operation unit 34 of the authentication terminal 30 is registered in the authentication terminal list L1.

FIG. 10 is a table for showing a data storage example of the approaching user list L2. As shown in FIG. 10, the approaching user list L2 is a list indicating users who have approached the authentication terminal 30. In this embodiment, a plurality of authentication terminals 30 are included, and therefore the approaching user list L2 shows, for each authentication terminal 30, the users who have approached the authentication terminal 30. For example, the approaching user list L2 stores, for each authentication terminal ID, the user ID of each user who has approached the authentication terminal 30 and the wireless communication ID for uniquely identifying the second wireless communication unit 23B.

The wireless communication ID may be any information capable of identifying the wireless communication interface, and is, for example, a UUID or a BLE-ID. The wireless communication ID is represented as any symbol string. The wireless communication ID may be fixed so as not to be editable by the user, or may be editable by the user. As described with reference to FIG. 3, in this embodiment, when the user moves into the communicable area A1, the authentication terminal ID, the user ID, and the wireless communication ID are uploaded, and therefore those uploaded pieces of information are stored in the approaching user list L2.

[Identification Information Acquisition Module]

The identification information acquisition module 101 is mainly implemented by the control unit 11. The identification information acquisition module 101 is configured to acquire identification information from the user terminals 20 that have approached the authentication terminal 30.

A user terminal 20 that has approached the authentication terminal 30 is the user terminal 20 of a user within a predetermined distance from the authentication terminal 30. In this embodiment, there is described a case in which the second wireless communication unit 33B entering the communicable area A1 indicating the communicable range corresponds to approaching the authentication terminal 30.

The area for determining whether or not a user terminal 20 has approached the authentication terminal 30 may be determined regardless of the communicable range. For example, a user terminal 20 may be determined as having approached the authentication terminal 30 when the user terminal 20 has approached to a distance shorter than the maximum distance of the communicable range of the second wireless communication unit 33B, or when the user terminal 20 has approached to a certain distance but is still outside the communicable area A1.

The identification information may be any information capable of identifying the user, and is, for example, a user ID, individual identification information on the user terminal 20, a telephone number of the user terminal 20, or a wireless communication ID. In this embodiment, there is described a case in which the user ID corresponds to identification information. Therefore, the term "user ID" in this embodiment can be read as "identification information".

The identification information acquisition module 101 acquires the user ID from the user terminal 20 when the user terminal 20 enters the communicable area A1. For example, the user terminal 20 spontaneously uploads the user ID when the user terminal 20 has approached the authentication terminal 30, and the identification information acquisition module 101 acquires the spontaneously uploaded user ID.

In place of the user ID being spontaneously uploaded when the user terminal 20 has approached the authentication terminal 30, the user ID may be periodically uploaded from the user terminal 20 to the server 10. That is, the user terminal 20 may periodically upload the user ID regardless of whether or not the user terminal 20 is close to an authentication terminal 30. In this case, the identification information acquisition module 101 may acquire position information together with the user ID of the user terminal 20, identify the user terminal 20 that has approached the authentication terminal 30, and acquire the user ID received from the user terminal 20 as the identification information on the user terminal 20 that has approached the authentication terminal 30.

[Authentication Module]

The authentication module 102 is mainly implemented by the control unit 11. The authentication module 102 is configured to perform authentication based on authentication information acquired by using the authentication terminal 30 (hereinafter simply referred to as "acquired authentication information") and authentication information registered in the data storage unit 100 in association with the user ID of the user in the vicinity of the authentication terminal 30 (hereinafter simply referred to as "registered authentication information").

The term "acquired authentication information" may refer to authentication information acquired by the authentication terminal 30 by itself, or to authentication information acquired by another computer based on information acquired by the authentication terminal 30. In this embodiment, the feature amount of the face corresponds to the authentication information, and the server 10 calculates the feature amount of the face. Therefore, the acquired authentication information is calculated based on an image acquired by the server 10 from the authentication terminal 30. The authentication terminal 30 may also calculate the feature amount of the face based on an image photographed by the photographing unit 36, and upload the calculated feature amount of the face to the server 10.

The acquired authentication information is information to be compared with the registered authentication information. In other words, the acquired authentication information is information to be used as a query during authentication. The registered authentication information is authentication information registered by the user, and is the authentication information that can be the correct answer during authentication. In other words, the registered authentication information is the information to be compared with the input authentication information, and is information to be used as an index during authentication. In this embodiment, the feature amount of the face stored in the user database DB corresponds to the registered authentication information.

The feature amount of the face is registered in the user database DB in association with the user ID, and is not associated with the wireless communication ID. Therefore, in this embodiment, the user ID is required in order to identify the registered authentication information, and it is not possible to identify the registered authentication information by using the individual identification information on the user terminal 20, the telephone number of the user terminal 20, or the wireless communication ID.

A user in the vicinity of the authentication terminal 30 is a user within a predetermined distance from the authentication terminal 30. In this embodiment, there is described a case in which the user being in the authentication-feasible area A2 in which authentication is possible corresponds to the user being in the vicinity of the authentication terminal 30. This embodiment distinguishes "approaching the authentication terminal 30", which refers to entering the communicable area A1, from "being in the vicinity of the authentication terminal 30", which refers to being in the authentication-feasible area A2. However, the meaning of those statements may be the same, and hence entering the authentication-feasible area A2 may refer to approaching the authentication terminal 30, and being in the communicable area A1 may refer to being in the vicinity of the authentication terminal 30.

The term "associated with" refers to a plurality of pieces of information being linked to each other. When one piece of information can be retrieved by using another piece of information, those pieces of information can be said to be "associated". In this embodiment, in the user database DB, the user ID and the authentication information are stored in the same record, and the user ID and the authentication information are registered in association with each other.

The authentication module 102 performs authentication by comparing the acquired authentication information with the registered authentication information. For example, the authentication module 102 performs authentication by determining whether or not the acquired authentication information matches or is similar to the registered authentication information. The authentication module 102 determines that authentication is not successful when the acquired authentication information does not match or is not similar to the registered authentication information, and determines that authentication is successful when the acquired authentication information matches or is similar to the registered authentication information.

The term "match" means that the input authentication information is the same as the registered authentication information. This term "match" does not mean a partial match, but means a perfect match. For this reason, in a case in which it is determined whether the authentication information matches, when the authentication information is even partially different, authentication is not successful. For example, in password authentication, a match between passwords is determined.

The term "similar" refers to whether or not the acquired authentication information is similar to the registered authentication information. In other words, similarity is the difference or the discrepancy between the input authentication information and the registered authentication information. For example, in biometric authentication, the similarity between pieces of biological authentication information is determined.

In this embodiment, there is described a case in which the similarity of the authentication information is determined. For example, the authentication module 102 calculates a similarity degree based on the acquired authentication information and the registered authentication information. When the similarity degree is less than a threshold value, the authentication module 102 determines that authentication is not successful, and when the similarity degree is equal to or more than the threshold value, the authentication module 102 determines that authentication is successful.

The similarity degree is an index indicating the degree of similarity. In other words, the similarity degree is an index indicating the size of the difference or discrepancy between those pieces of authentication information. As the similarity degree becomes higher, those pieces of authentication information become more similar to each other, and as the similarity degree becomes lower, those pieces of authentication information become less similar to each other. The similarity degree can also be said to be the probability that the authentication information is similar. The similarity degree may be indicated as a percentage between 0% and 100%, or may be indicated as another numerical range.

In this embodiment, biometric authentication is used, and therefore the authentication module 102 performs authentication based on biometric authentication information acquired by using the authentication terminal 30 and the registered biometric authentication information. For example, the authentication module 102 calculates the similarity degree based on the feature amount indicated by the acquired biometric authentication information and the feature amount indicated by the registered biometric authentication information. The difference between those feature amounts may be directly used as the similarity degree, or the similarity degree may be calculated by substituting those feature amounts into a predetermined calculation formula. When the feature amounts are expressed as vectors, the distance between the vectors may be the similarity degree.

In this embodiment, when a user has approached the authentication terminal 30, the user ID is transmitted from the user terminal 20 to the server 10. Therefore, the authentication module 102 acquires the registered authentication information and performs authentication based on the user ID acquired from the user terminal 20. The user ID received from the user terminal 20 is stored in the approaching user list L2. Therefore, the authentication module 102 performs authentication based on authentication information registered in association with the user ID stored in the approaching user list L2.

[Possibility Determination Module]

The possibility determination module 103 is mainly implemented by the control unit 11. The possibility determination module 103 is configured to determine, when there are a plurality of users in the vicinity of the authentication terminal 30, whether or not there is a possibility that one user is authenticated as another user.

The term "possibility" as used herein refers to a possibility of impersonation by at least one of a plurality of users who are in the vicinity of the authentication terminal 30. In other words, "possibility" refers to the possibility of any one of the plurality of users in the vicinity of the authentication terminal 30 being erroneously authenticated as another user. In the following description, the possibility determined by the possibility determination module 103 is referred to as the "possibility of impersonation". Therefore, "possibility of impersonation" in this embodiment can be simply read as "possibility".

The possibility determination module 103 determines whether or not there is the possibility of impersonation based on at least one of the acquired authentication information and the registered authentication information. In this embodiment, there is described a case in which the possibility determination module 103 determines whether or not there is the possibility of impersonation based on both of those pieces of authentication information, but as described later in the modification examples, the possibility determination module 103 may determine the possibility of impersonation based on only one of those pieces of authentication information.

For example, the determination module 103 determines that there is the possibility of impersonation when there are a plurality of pieces of registered authentication information that match or are similar to the acquired authentication information. In other words, the possibility determination module 103 determines that there is the possibility of impersonation when, among the plurality of users in the vicinity of the authentication terminal 30, there are a plurality of users for which authentication can be successful based on the acquired authentication information.

The possibility determination module 103 identifies the number of users having registered authentication information similar to the acquired authentication information among the plurality of users in the vicinity of the authentication terminal 30. When the number of identified users is one, the possibility determination module 103 does not determine that there is the possibility of impersonation. When a plurality of users are identified, that is, the number of identified users is two or more, the possibility determination module 103 determines that there is the possibility of impersonation.

In this embodiment, users who are in the vicinity of the authentication terminal 30 are detected by using short-range wireless communication. Therefore, the possibility determination module 103 determines whether or not there is the possibility of impersonation when it is determined that there are a plurality of users in the vicinity of the authentication terminal 30 based on the communication content of short-range wireless communication. When there are no users or only one user in the vicinity of the authentication terminal 30, the possibility determination module 103 is not required to execute the processing of determining the possibility of impersonation.

For the short-range wireless communication, any communication standard that enables direct communication between terminals may be used. In this embodiment, there is described a case in which Bluetooth (trademark) is used, but another communication standard, for example, the abovementioned Wi-Fi, may also be used. In short-range wireless communication, when each of a plurality of terminals is in the communication range of another communication terminal, direct communication without passing through another device is possible. The communication range of the short-range wireless communication may be a range defined by the communication standard, for example, from about 1 meter to about 100 meters.

[Restriction Module]

The restriction module 104 is mainly implemented by the control unit 11. The restriction module 104 is configured to restrict successful authentication when it is determined that there is the possibility of impersonation. The restriction module 104 does not restrict successful authentication when it is not determined that there is the possibility of impersonation.

"Restrict successful authentication" means configuring such that the authentication module 102 does not determine that authentication is successful. In other words, "not determine that authentication is successful" is equivalent to "restrict successful authentication" even when the acquired authentication information and the registered authentication information match or are similar. The term "restrict" as used herein has the same meaning as "prohibit", and is the opposite meaning to "permit".

In this embodiment, when authentication is successful, the server 10 executes predetermined processing. When successful authentication is restricted by the restriction module 104, the predetermined processing is not executed. For this reason, restricting successful authentication can also mean prohibiting execution of the predetermined processing. The predetermined processing may be any processing permitted to be executed on condition that authentication is successful. In this embodiment, the predetermined processing is transmitting to the authentication terminal 30 information indicating that authentication is successful, or transmitting to the authentication terminal 30 a command to unlock the gate SG. The predetermined processing may be determined in accordance with the situation in which the authentication system S is to be used, and may be, for example, payment processing or processing for displaying an image showing that the use of a service is permitted.

The restriction by the restriction module 104 may be released at any timing. For example, after it is determined that there is the possibility of impersonation and successful authentication has been restricted, the restriction module 104 permits successful authentication when it is no longer determined that there is the possibility of impersonation. The restriction module 104 continuously restricts successful authentication until it is no longer determined that there is the possibility of impersonation.

[Notification Module]

The notification module 105 is mainly implemented by the control unit 11. The notification module 105 is configured to issue a predetermined notification to at least one of the plurality of users when it is determined that there is the possibility of impersonation.

The predetermined notification is a notification indicating that successful authentication is restricted. In other words, the predetermined notification is a notification issued when it is determined that there is the possibility of impersonation. In the following description, the notification issued by the notification module 105 is referred to as an "authentication restriction notification".

The authentication restriction notification may be any notification that can be perceived by a human. In this embodiment, a visual notification is described as an example, but the authentication restriction notification may be an auditory notification using sound or a tactile notification using vibrations or the like. The content of the authentication restriction notification may be editable by the administrator of the authentication system S. The content of the authentication restriction notification may be, for example, content urging a user to move away from the authentication terminal 30, content indicating that there is a user having a similar face, or content indicating that authentication is not successful.

In this embodiment, the notification module 105 is implemented by the server 10. Therefore, the notification module 105 issues the authentication restriction notification by transmitting, to the user terminal 20 or the authentication terminal 30, data for issuing the authentication restriction notification. This data can have any form, such as a message, an image, a push notification, or an electronic mail. The data for issuing the authentication restriction notification is stored in the data storage unit 100 in advance. The notification module 105 issues the authentication restriction notification based on the data stored in the data storage unit 100.

The authentication restriction notification may be issued by using the user terminal 20 in place of using the authentication terminal 30. For example, the notification module 105 may transmit the authentication restriction notification to the user terminal 20 of at least one of the plurality of users in the vicinity of the authentication terminal. In this case, the authentication restriction notification may be issued to all of the plurality of users, or the authentication restriction notification may be issued to only some of the users.

[Exclusion Module]

The exclusion module 106 is mainly implemented by the control unit 11. The exclusion module 106 is configured to exclude registered authentication information such that the registered authentication information is not used in authentication when a user terminal 20 that has approached the authentication terminal 30 moves away from the authentication terminal 30.

"Moving away from the authentication terminal 30" means moving to a position that is a predetermined distance or more from the authentication terminal 30. That is, a change from a state of being close to the authentication terminal 30 to a state of not being close to the authentication terminal 30 corresponds to moving away from the authentication terminal 30. In this embodiment, entering the communicable area A1 indicating the range in which the second wireless communication unit 33B can communicate corresponds to approaching the authentication terminal 30, and therefore leaving the communicable area A1 corresponds to moving away from the authentication terminal 30.

The term "exclude" means that the registered authentication information is not compared with the acquired authentication information, or that the registered authentication information is not referred to by the authentication module 102. In other words, "exclude" corresponds to not using the registered authentication information as an index during authentication. In this embodiment, there is described a case in which exclusion is performed by deleting the user ID stored in the approaching user list L2, but in place of deleting the user ID, the exclusion may also be performed by changing a flag or other such information.

In this embodiment, the authentication restriction notification is transmitted when the user terminal 20 moves away from the authentication terminal 30. Therefore, when the authentication restriction notification is received, the exclusion module 106 excludes the registered authentication information such that the registered authentication information is not used in authentication. The exclusion module 106 excludes the registered authentication information such that the registered authentication information is not used in authentication on condition that the authentication restriction notification has been received. Therefore, the exclusion module 106 does not perform exclusion until the authentication restriction notification is received, and performs exclusion in response to receiving the authentication restriction notification.

[1-3-2. Functions to be Implemented by User Terminal]

As illustrated in FIG. 7, in the user terminal 20, a data storage unit 200, a first acquisition module 201, a second acquisition module 202, an approach determination module 203, an identification information transmission module 204, a leaving determination module 205, and a notification transmission module 206 are implemented.

[Data Storage Unit]

The data storage unit 200 is mainly implemented by the storage unit 22. The data storage unit 200 is configured to store the data required for executing the processing described in this embodiment. For example, the data storage unit 200 stores the data of the face photograph of the user. Further, for example, the data storage unit 200 may also store the user ID, a password, the individual identification information on the user terminal 20, the telephone number of the user terminal 20, or an ID of the communication unit 23. In this embodiment, the first wireless communication unit 23A and the second wireless communication unit 23B are included in the communication unit 23, and therefore the ID of the communication unit 23 includes the wireless communication ID of the first wireless communication unit 23A and the wireless communication ID of the second wireless communication unit 23B.

In this embodiment, the data storage unit 200 stores the authentication terminal list L1. The data storage example of the authentication terminal list L1 is as described with reference to FIG. 9. It is not required that the authentication terminal list L1 stored in the data storage unit 200 show information on all of the authentication terminals 30, and the authentication terminal list L1 may show only information on a part of the authentication terminals 30. For example, the data storage unit 200 may store an authentication terminal list L1 showing only information on authentication terminals 30 connected to a security gate SG through which the user can pass.

[First Acquisition Module]

The first acquisition module 201 is mainly implemented by the control unit 21. The first acquisition module 201 is configured to acquire authentication terminal position information on the position of the authentication terminal 30. In this embodiment, the authentication terminal position information is stored in the authentication terminal list L1, and therefore the first acquisition module 201 refers to the authentication terminal list L1 stored in the data storage unit 200 to acquire the authentication terminal position information. When the authentication terminal list L1 is not stored in the data storage unit 200, the first acquisition module 201 may refer to the authentication terminal list L1 stored in the data storage unit 200 of the server 10 to acquire the authentication terminal position information.

[Second Acquisition Module]

The second acquisition module 202 is mainly implemented by the control unit 21. The second acquisition module 202 is configured to acquire user terminal position information on the position of the user terminal 20.

The user terminal position information is information capable of identifying the current position of the user terminal 20, and is, for example, latitude and longitude information, coordinate information, access point information, beacon information, or cell phone base station information. In this embodiment, there is described a case in which the user terminal position information is latitude and longitude information or coordinate information, and the second acquisition module 202 acquires the user terminal position information based on a signal received by the GPS receiving unit 26 of the user terminal 20.

When the user terminal position information is access point information, beacon information, or cell phone base station information, the second acquisition module 202 acquires the user terminal position information based on the communication content of the communication unit 23 of the user terminal 20. The second acquisition module 202 may acquire the user terminal position information based on another method. For example, when the user terminal 20 includes a photographing unit, the second acquisition module 202 may acquire the user terminal position information based on an image photographed by the photographing unit.

[Approach Determination Module]

The approach determination module 203 is mainly implemented by the control unit 21. The approach determination module 203 is configured to determine whether or not the user terminal 20 has approached the authentication terminal 30 based on the authentication terminal position information and the user terminal position information. For example, the approach determination module 203 calculates the distance between the position indicated by the authentication terminal position information and the position indicated by the user terminal position information, and determines that the user terminal 20 has approached the authentication terminal 30 when the calculated distance is less than a threshold value. In this embodiment, entering the communicable area A1 corresponds to approaching the authentication terminal 30. Therefore, the approach determination module 203 determines whether or not the user terminal 20 has entered the communicable area A1 set based on the authentication terminal position information.

When access point information or the like is used, the approach determination module 203 may determine whether or not the authentication terminal position information and the user terminal position information match each other. The approach determination module 203 determines that the user terminal 20 has approached the authentication terminal 30 when those pieces of information match. Moreover, for example, the approach determination module 203 may determine whether or not the position indicated by the user terminal position information is included in the area indicated by the authentication terminal position information. The approach determination module 203 determines that the user terminal 20 has approached the authentication terminal 30 when the position indicated by the user terminal position information is included in the area indicated by the authentication terminal position information.

[Identification Information Transmission Module]

The identification information transmission module 204 is mainly implemented by the control unit 21. The identification information transmission module 204 is configured to transmit the user ID when it is determined that the user terminal 20 has approached the authentication terminal 30. The identification information transmission module 204 transmits the user ID on condition that it is determined that the user terminal 20 has approached the authentication terminal 30. The identification information transmission module 204 does not transmit the user ID until it is determined that the user terminal 20 has approached the authentication terminal 30, and transmits the user ID in response to the user terminal 20 having approached the authentication terminal 30. In this embodiment, there is described a case in which the transmission destination of the user ID is the server 10, but the transmission destination may be another computer, or the user ID may be transmitted to the server 10 via another computer.

[Leaving Determination Module]

The leaving determination module 205 is mainly implemented by the control unit 21. The leaving determination module 205 is configured to determine whether or not the user terminal 20 has moved away from the authentication terminal 30 based on the authentication terminal position information and the user terminal position information. For example, the leaving determination module 205 calculates the distance between the position indicated by the authentication terminal position information and the position indicated by the user terminal position information, and determines that the user terminal 20 has moved away from the authentication terminal 30 when the calculated distance is a threshold value or more. In this embodiment, leaving the communicable area A1 corresponds to moving away from the authentication terminal 30. Therefore, the approach determination module 203 determines whether or not the user terminal 20 has left the communicable area A1 set based on the authentication terminal position information.

Further, for example, when access point information or the like is used, the leaving determination module 205 may determine whether or not the authentication terminal position information and the user terminal position information match each other. The leaving determination module 205 determines that the user terminal 20 has moved away from the authentication terminal 30 when those pieces of information do not match. Moreover, for example, the leaving determination module 205 may determine whether or not the position indicated by the user terminal position information is included in the area indicated by the authentication terminal position information. The leaving determination module 205 determines that the user terminal 20 has moved away from the authentication terminal 30 when the position indicated by the user terminal position information is not included in the area indicated by the authentication terminal position information.

[Notification Transmission Module]

The notification transmission module 206 is mainly implemented by the control unit 21. The notification transmission module 206 is configured to transmit a predetermined notification when it is determined that a user has moved away from the authentication terminal 30. In this embodiment, there is described a case in which the destination of the notification is the server 10. However, the destination may be another computer, or the notification may be transmitted to the server 10 via another computer. The predetermined notification is a notification indicating that the user has moved away from the authentication terminal 30. In the following description, the notification issued by the notification transmission module 206 is referred to as a "leaving notification". The notification transmission module 206 transmits the leaving notification by transmitting data having a predetermined format indicating that the user has moved away from the authentication terminal 30.

[1-3-3. Functions to be Implemented by Authentication Terminal]

As illustrated in FIG. 7, in the authentication terminal 30, a data storage unit 300 and a communication content determination module 301 are implemented. In this embodiment, there is described a case in which the authentication terminal 30 is included in the authentication system S. However, the authentication terminal 30 may be an external apparatus that can communicate to and from the authentication system S.

[Data Storage Unit]

The data storage unit 300 is mainly implemented by the storage unit 32. The data storage unit 300 is configured to store the data required for executing the processing described in this embodiment. For example, the data storage unit 300 stores the authentication terminal ID of the authentication terminal 30 and the communication partner list L3.

FIG. 11 is a table for showing a data storage example of the communication partner list L3. As shown in FIG. 11, the communication partner list L3 is a list of the user terminals 20 in the communicable area A1 of the second wireless communication unit 33B of the authentication terminal 30. For example, the communication partner list L3 stores the wireless communication ID of the second wireless communication unit 23B of each user terminal 20 in the communicable area A1, and the distance between each user terminal 20 and the authentication terminal 30.

The wireless communication ID is acquired by short-range wireless communication performed between the user terminal 20 and the authentication terminal 30. The distance is measured based on the signal strength of the short-range wireless communication performed between the user terminal 20 and the authentication terminal 30. In place of short-range wireless communication, the distance may be acquired by analyzing an image from the photographing unit 36, or by using another method such as a depth sensor or an ultrasonic sensor.

[Communication Content Determination Module]

The communication content determination module 301 is mainly implemented by the control unit 31. The communication content determination module 301 is configured to determine whether or not there is a user in the vicinity of the authentication terminal 30 based on the communication content of short-range wireless communication performed between the authentication terminal 30 and the user terminals 20. In this embodiment, the communication content is the content of the data exchanged between the second wireless communication unit 23B of the user terminal and the second wireless communication unit 33B of the authentication terminal 30.

The communication content determination module 301 determines whether or not there is a user in the vicinity of the authentication terminal 30 by determining whether or nota wireless communication ID has been received from a user terminal 20 by short-range wireless communication. The communication content determination module 301 does not determine that there is a user in the vicinity of the authentication terminal 30 when a wireless communication ID is not received, and determines that there is a user in the vicinity of the authentication terminal 30 when a wireless communication ID is received.

In this embodiment, Bluetooth (trademark) is described as an example of the short-range wireless communication, but any short-range wireless communication capable of directly communicating between terminals may be used, and another communication standard may be used. For example, Wi-Fi or infrared communication may be used.

The short-range wireless communication in this embodiment can measure a distance between the authentication terminal 30 and the user terminal 20, and the communication content determination module 301 determines whether or not there is a user in the vicinity of the authentication terminal 30 based on the distance measured by the short-range wireless communication. As the method of measuring the distance, the method defined in the communication standard can be used, and the signal strength in short-range wireless communication may be used. For example, the measured distance becomes shorter as the signal strength becomes stronger, and the measured distance becomes longer as the signal strength becomes weaker.

The communication content determination module 301 does not determine that there is a user in the vicinity of the authentication terminal 30 when the distance between the authentication terminal 30 and the user terminal 20 is equal to or more than a threshold value, and determines that there is a user in the vicinity of the authentication terminal 30 when the distance is less than the threshold value. In this embodiment, being in the authentication-feasible area A2 corresponds to being in the vicinity of the authentication terminal 30, and therefore the communication content determination module 301 determines whether or not a user is in the authentication-feasible area A2, which is the area within a predetermined distance from the authentication terminal 30.

1-4. Processing to be Executed in First Embodiment

Figure 12:
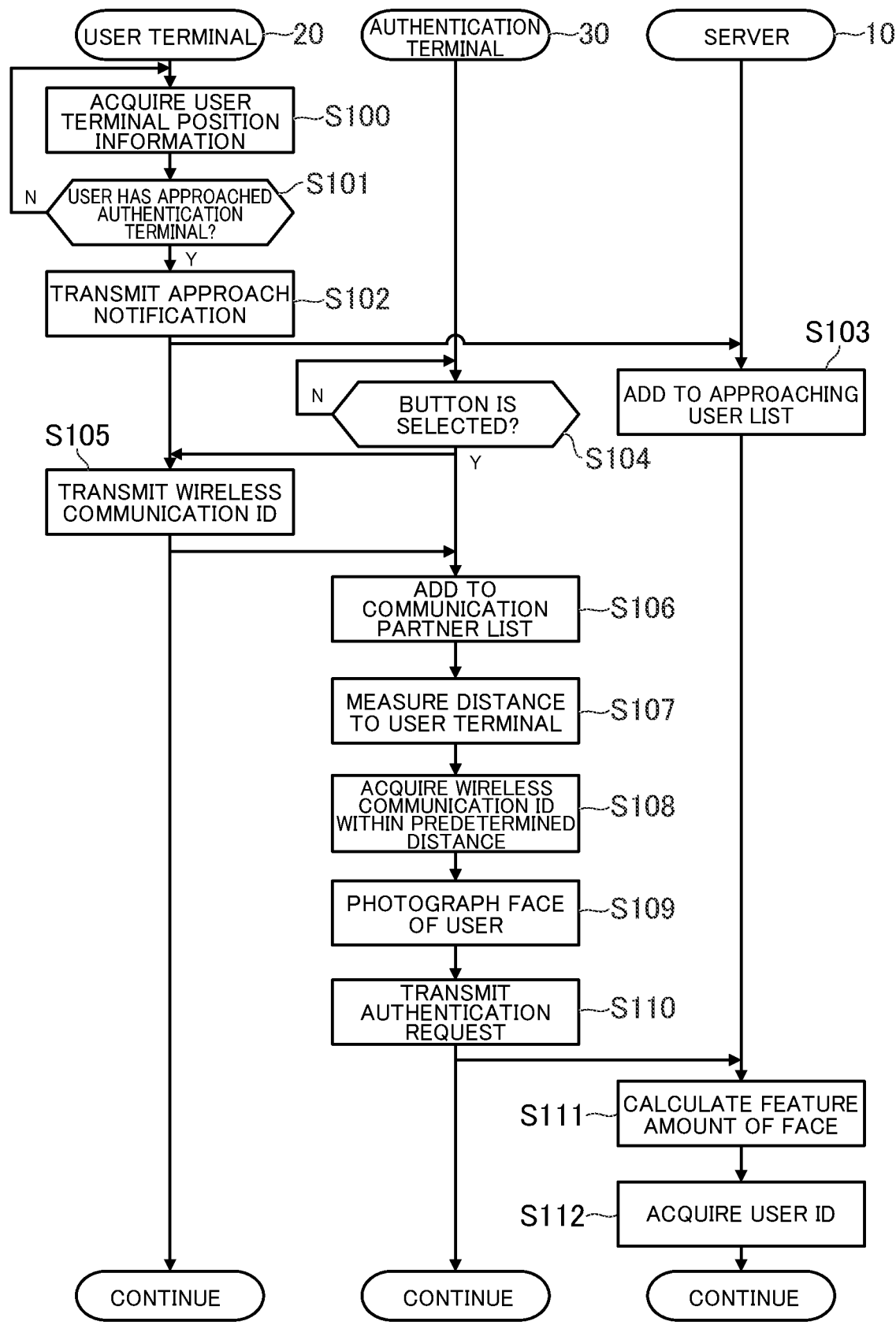
FIG. 12 is a flowchart for illustrating processing to be executed in the first embodiment.
Figure 13:
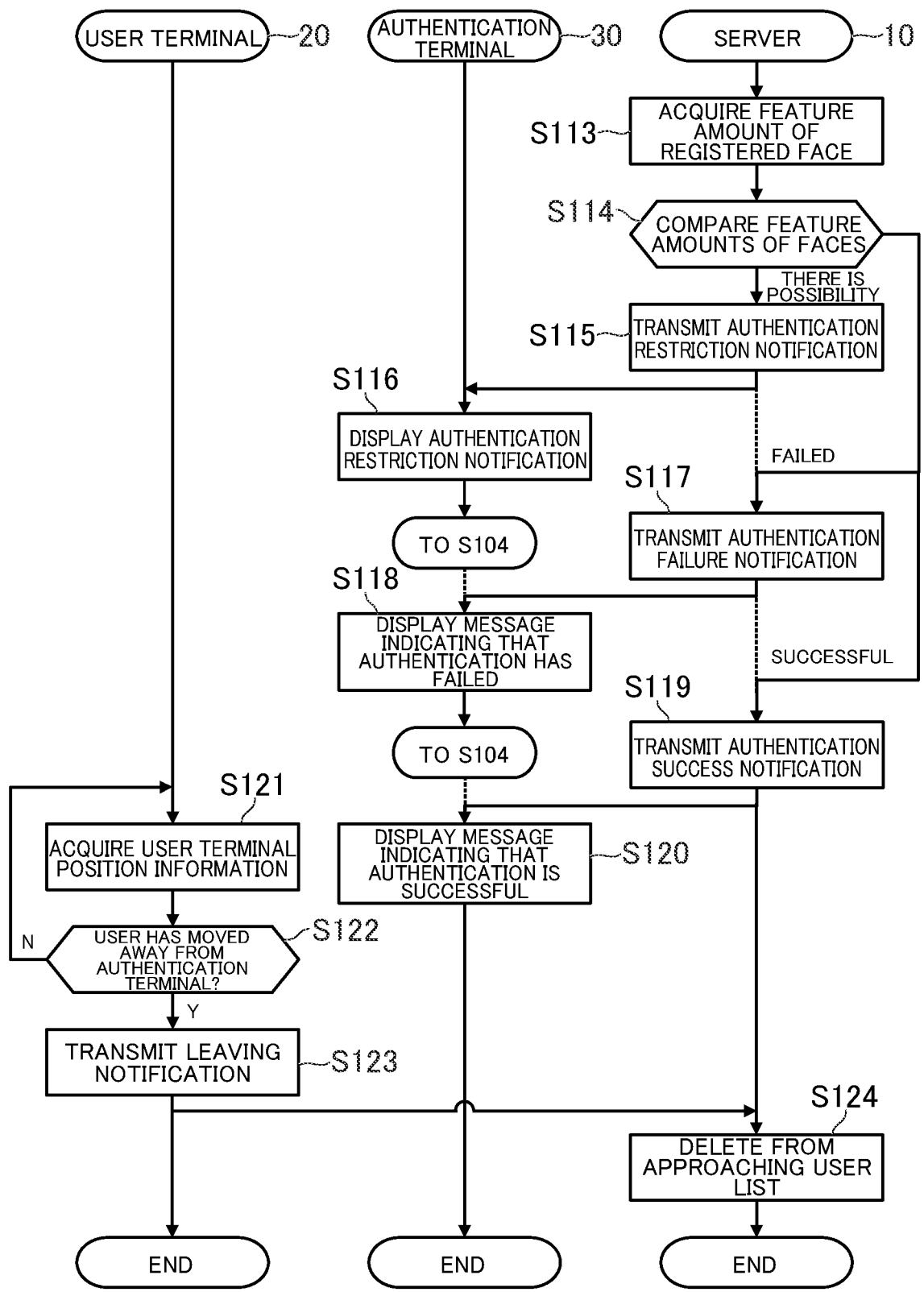
FIG. 13 is a flowchart for illustrating the processing to be executed in the first embodiment.

FIG. 12 and FIG. 13 are flowcharts for illustrating processing to be executed in the first embodiment. The processing illustrated in FIG. 12 and FIG. 13 is executed by the control units 11, 21 and 31 operating in accordance with programs stored in the storage units 12, 22, and 32, respectively. The processing described below is an example of processing to be executed by the functional blocks illustrated in FIG. 7.

As illustrated in FIG. 12, first, in the user terminal 20, the control unit 21 acquires user terminal position information based on a signal received by the GPS receiving unit 26 (Step S100). The processing of Step S100 is executed periodically, and the control unit 21 repeatedly acquires the user terminal position information indicating the latest current position.

The control unit 21 determines, based on the authentication terminal list L1 stored in the storage unit 22, whether or not the user has approached the authentication terminal 30 (Step S101). In Step S101, the control unit 21 determines, for each authentication terminal ID stored in the authentication terminal list L1, whether or not a distance calculated based on the authentication terminal position information and the user terminal position information is equal to or more than a threshold value.

In this embodiment, there is described a case in which the threshold value to be used in Step S101 is the radius of the communicable area A1 of FIG. 3, but the threshold value may be any value. When the distance is equal to or more than the threshold value, the control unit 21 does not determine that the user has approached the authentication terminal 30, and when the distance is less than the threshold value, the control unit 21 determines that the user has approached the authentication terminal 30. In Step S101, the control unit 21 determines whether or not the user has moved into the communicable area A1.

When it is not determined that the user has approached the authentication terminal 30 (Step S101: N), the processing returns to Step S100. Meanwhile, when it is determined that the user has approached the authentication terminal 30 (Step S101: Y), the control unit 21 uses the first wireless communication unit 23A to transmit to the server 10 an approach notification indicating that the user has approached the authentication terminal 30 (Step S102). The approach notification may be issued by transmitting data having a predetermined format, and includes, for example, the authentication terminal ID of the authentication terminal 30 that the user has approached, the user ID, and the wireless communication ID of the second wireless communication unit 23B.

When the server 10 receives the approach notification, the control unit 11 adds the user who has approached the authentication terminal 30 to the approaching user list L2 (Step S103). In Step S103, the control unit 11 adds the authentication terminal ID, the user ID, and the wireless communication ID included in the received approach notification to the approaching user list L2.

The control unit 31 determines, based on a detection signal from the operation unit 34, whether or not the button B35 displayed on the display unit 35 is selected (Step S104). When it is not determined that the button B35 is selected (Step S104: N), the processing returns to Step S104, and the control unit 31 waits for the button B35 to be selected.

Meanwhile, when it is determined that the button B35 is selected (Step S104: Y), the authentication terminal 30 issues to the user terminal 20 a request for the wireless communication ID, and the control unit 21 of the user terminal 20 uses the second wireless communication unit 23B to transmit the wireless communication ID of the second wireless communication unit 23B to the authentication terminal 30 (Step S105). In Step S105, the second wireless communication unit 23B of the user terminal 20 transmits the wireless communication ID to the authentication terminal 30 by using an advertisement packet without establishing pairing.

When the authentication terminal 30 receives the wireless communication ID, the control unit 31 adds the received wireless communication ID to the communication partner list L3 (Step S106), scans the strength of the signal received by the second wireless communication unit 23B, and measures the distance to the user terminal 20 (Step S107). The processing of Step S105 to Step S107 may be executed before the button B35 is touched.

The control unit 31 acquires the wireless communication ID of each user terminal 20 within a predetermined distance from the authentication terminal 30 based on the list (Step S108). In Step S108, the control unit 31 acquires, from among the wireless communication IDs stored in the list, the wireless communication IDs having a distance measured in Step S107 that is less than a threshold value. In this embodiment, this threshold value is set in accordance with the authentication-feasible area A2, and hence in Step S108 the control unit 31 acquires the wireless communication IDs of the user terminals 20 that are in the authentication-feasible area A2.

The control unit 31 uses the photographing unit 36 to photograph the face of the user (Step S109). In Step S109, the control unit 31 generates image data indicating a photography result based on the detection signals from the photography unit 36.

The control unit 31 transmits to the server 10 an authentication request for requesting execution of authentication processing (Step S110). The authentication request may be issued by transmitting data having a predetermined format. The authentication request includes, for example, the authentication terminal ID stored in the storage unit 32, the wireless communication IDs acquired in Step S108, and the images photographed in Step S109.

When the server 10 receives the authentication request, the control unit 11 calculates the feature amount of the face of the user in front of the authentication terminal 30 based on the image included in the authentication request (Step S111). The feature amount of the face calculated in Step S111 is the authentication information acquired by using the authentication terminal 30.

The control unit 11 acquires, from among the user IDs in the approaching user list L2, the user ID of each user within the predetermined distance from the authentication terminal 30 (Step S112). In Step S112, the control unit 11 acquires, from among the user IDs in the approaching user list L2, the user ID of each record in which the authentication terminal ID and the wireless communication ID included in the authentication processing are stored. In other words, the control unit 11 searches the approaching user list L2 by issuing a query for the authentication terminal ID and the wireless communication ID included in the authentication request, and acquires the user ID stored in each retrieved record.

Moving to FIG. 13, the control unit 11 acquires, based on the user database DB, the feature amount of the face registered in association with the user ID acquired in Step S111 (Step S113). In Step S113, the control unit 11 refers to the records in the user database DB in which the user IDs acquired in Step S112 are stored, and acquires the feature amount of the face stored in each record. The feature amount of the face acquired in Step S113 is the registered authentication information.

The control unit 11 compares the acquired feature amount of the face and the registered feature amount of the face (Step S114). In Step S114, the control unit 11 calculates, for each user ID acquired in Step S112, the similarity degree between the acquired feature amount of the face and the registered feature amount of the face, and determines whether or not the similarity degree is equal to or more than a threshold value.

In Step S114, the control unit 11 determines that there is the possibility of impersonation when there are a plurality of user IDs having a similarity degree equal to or more than the threshold value. When there is only one user ID having a similarity degree equal to or more than the threshold value, the control unit 11 determines that there is no possibility of impersonation. The control unit 11 determines that authentication has failed when there is no user ID having a similarity degree equal to or more than the threshold value.

When it is determined in Step S114 that there is the possibility of impersonation (Step S114: there is possibility), the control unit 11 restricts successful authentication and transmits an authentication restriction notification to the authentication terminal 30 (Step S115). In this case, the processing of Step S119 described later is not executed, and the security gate SG is not unlocked.

When the authentication terminal 30 receives the authentication restriction notification, the control unit 31 displays the authentication restriction notification on the display unit 35 (Step S116), and returns to the processing of Step S104. When the processing of Step S116 is executed, the authentication terminal 30 is in the state of FIG. 5, and the security gate SG is not unlocked.

Meanwhile, in Step S114, when it is determined that authentication has failed (Step S114: failed), the control unit 11 transmits to the authentication terminal 30 an authentication failure notification indicating that authentication has failed (Step S117). The authentication failure notification may be issued by transmitting data having a predetermined format. When the authentication terminal 30 receives the authentication failure notification, the control unit 31 displays a message indicating that authentication failed on the display unit 35 (Step S118), and returns to the processing of Step S104.

Meanwhile, in Step S114, when it is determined that there is no possibility of impersonation (Step S114: successful), the control unit 11 permits successful authentication, and transmits to the authentication terminal 30 an authentication success notification indicating that authentication is successful (Step S119). The authentication success notification may be issued by transmitting data having a predetermined format, and includes, for example, a code indicating a command to unlock the security gate SG.

When the authentication terminal 30 receives the authentication success notification, the control unit 31 displays a message indicating that authentication is successful on the display unit 35 (Step S120). When the processing of Step S120 is executed, the authentication terminal 30 is in the state of FIG. 4 or FIG. 6, and the security gate SG is unlocked.

Meanwhile, in the user terminal 20, the control unit 21 acquires the user terminal position information based on the signal received by the GPS receiving unit 26 (Step S121). The processing of Step S121 is the same as that of Step S100.

The control unit 21 determines whether or not the user has moved away from the authentication terminal 30 (Step S122). In Step S122, the control unit 21 determines whether or not the distance calculated based on the authentication terminal position information on the authentication terminal 30 determined as having approached in Step S101 and the user terminal position information acquired in Step S121 is equal to or more than a threshold value. In this embodiment, there is described a case in which the threshold value to be used in Step S122 and the threshold value to be used in Step S101 are the same, but those threshold values may be different.

When it is not determined that the user has moved away from the authentication terminal 30 (Step S122: N), the processing returns to Step S121. Meanwhile, when it is determined that the user has moved away from the authentication terminal 30 (Step S122: Y), the control unit 21 uses the first wireless communication unit 23A to transmit to the server 10 a leaving notification indicating that the user has moved away from the authentication terminal 30 (Step S123). The leaving notification may be issued performed by transmitting data having a predetermined format, and includes, for example, the authentication terminal ID of the authentication terminal 30 from which the user has moved away, the user ID, and the wireless communication ID of the second wireless communication unit 23B.

When the server 10 receives the leaving notification, the control unit 11 deletes from the approaching user list L2 the user who has moved away from the authentication terminal 30 (Step S124), and the processing ends. In Step S124, the control unit 11 deletes from the approaching user list L2 the authentication terminal ID, the user ID, and the wireless communication ID included in the received leaving notification.

According to the authentication system S described above, in a case in which there are a plurality of users in the vicinity of the authentication terminal 30, whether or not there is the possibility of impersonation is determined, and when it is determined that there is the possibility of impersonation, security is enhanced by restricting successful authentication to prevent impersonation. Further, in a case in which there are a plurality of users in the vicinity of the authentication terminal 30, when successful authentication is mandatorily restricted regardless of whether or not the faces are similar to each other, successful authentication is restricted despite the fact that there is no possibility of impersonation, and user's convenience is thus reduced. In this regard, in the authentication system S, when the faces of a plurality of users in the vicinity of the authentication terminal 30 are not similar to each other and there is no possibility of impersonation, successful authentication is not restricted, and therefore user's convenience can be enhanced.

Further, after it is determined that there is the possibility of impersonation and successful authentication has been restricted, through permitting successful authentication when it is no longer determined that there is the possibility of impersonation, a situation in which authentication is not successful despite the fact that the user having a similar face is no longer in the vicinity of the authentication terminal 30 can be prevented, and user's convenience can be enhanced.

Moreover, when there are a plurality of pieces of registered authentication information that match or are similar to the acquired authentication information, through determining that there is the possibility of impersonation, whether or not there is the possibility of impersonation can be accurately determined.

Moreover, when it is determined that there is the possibility of impersonation, through issuing an authentication restriction notification to at least one of the plurality of users, the users can grasp that there is the possibility of impersonation. A legitimate user can understand why authentication is not successful, and can take measures, for example, asking another user having a similar face to move away from the legitimate user, in order to enable authentication to be successful.

Moreover, authentication is executed by acquiring the registered authentication information based on the user ID acquired from the user terminal 20 that has approached the authentication terminal 30, and therefore the user who has approached the authentication terminal 30 can be accurately identified. The user terminal 20 transmits the user ID spontaneously, which enables authentication to be executed without the user taking out the user terminal 20 from his or her pocket or bag, to thereby save the user time and effort.

Moreover, through excluding the registered authentication information such that the registered authentication information is not used in authentication when the user terminal 20 approaching the authentication terminal 30 moves away from the authentication terminal 30, it is possible to prevent the authentication from being unsuccessful despite the fact that the user having a similar face has moved away from the authentication terminal 30, to thereby enhance user's convenience.

Moreover, in the user terminal 20, through determining whether or not a user has approached the authentication terminal 30 based on the authentication terminal position information and the user terminal position information, and uploading the user ID when it is determined that a user has approached the authentication terminal 30, the server 10 is not required to determine whether or not a user has approached the authentication terminal 30, which enables the processing load on the server 10 to be reduced. Further, when the server 10 determines whether or not a user has approached the authentication terminal 30, it is required to always upload the user terminal position information from the user terminal 20 to the server 10, which may increase the communication load on the network N. However, through performing the determination in the user terminal 20, it is not required to upload the user terminal position information, and the communication load on the network N can be reduced.

Moreover, in the user terminal 20, through determining whether or not a user has moved away from the authentication terminal 30 based on the authentication terminal position information and the user terminal position information, and uploading the leaving notification when it is determined that a user has moved away from the authentication terminal 30, the server 10 is not required to determine whether or not a user has moved away from the authentication terminal 30, which enables the processing load on the server 10 to be reduced. Further, when the server 10 determines whether or not a user has moved away from the authentication terminal 30, it is required to always upload the user terminal position information from the user terminal 20 to the server 10, which may increase the communication load on the network N. However, through performing the determination in the user terminal 20, it is not required to upload the user terminal position information, and the communication load on the network N can be reduced.

Moreover, through determining whether or not there is a user in the vicinity of the authentication terminal 30 based on the communication content of short-range wireless communication performed between the authentication terminal 30 and the user terminal 20, the user in the vicinity of the authentication terminal 30 can be accurately identified.

Moreover, through determining whether or not there is a user in the vicinity of the authentication terminal 30 based on a distance measured by using short-range wireless communication capable of measuring the distance between the authentication terminal 30 and the user terminal 20, the users in the vicinity of the authentication terminal 30 can be identified more accurately.

Moreover, in biometric authentication, for example, face authentication, the success or failure of authentication is determined based on the similarity of the authentication information, and therefore impersonation is relatively easy. However, through determining whether or not there is the possibility of impersonation when there are a plurality of users in the vicinity of the authentication terminal 30, impersonation can be prevented and security can be enhanced even when biometric authentication is used.

2. Second Embodiment

Next, a second embodiment of the present invention (hereinafter referred to as "second embodiment") is described. In the first embodiment, there is described a case in which the second wireless communication unit 23B of the user terminal 20 is in an on state, and when a user approaches the authentication terminal 30, short-range wireless communication is performed by using the second wireless communication units 23B and 33B. In this regard, when the second wireless communication unit 23B is in an off state, the user is required to manually turn on the second wireless communication unit 23B before executing authentication, which takes time and effort. Further, when the second wireless communication unit 23B is always in the on state, power is wastefully consumed when short-range wireless communication is not required.

Therefore, in the second embodiment, when the second wireless communication unit 23B is in the off state, the user terminal 20 automatically switches the second wireless communication unit 23B from the off state to the on state on condition that the user terminal 20 approaches the authentication terminal 30, to thereby reduce power consumption without involving time and effort by the user. Details of the second embodiment are now described. In the second embodiment, a description of parts that are the same as in the first embodiment is omitted.

2-1. Functions to be Implemented in Second Embodiment

Figure 14:
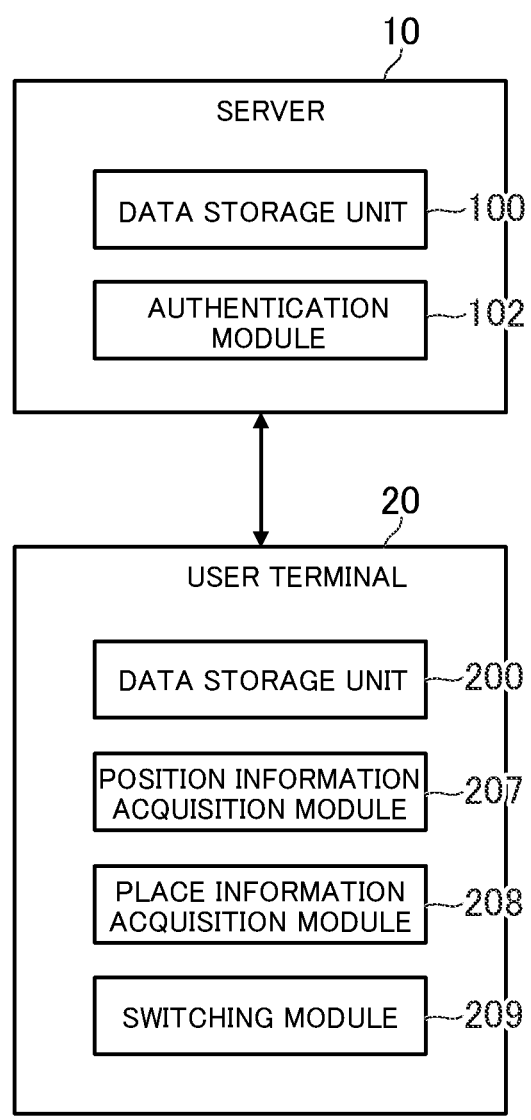
FIG. 14 is a functional block diagram of a second embodiment of the present invention.

FIG. 14 is a functional block diagram of the second embodiment. As illustrated in FIG. 14, in the second embodiment, functions to be implemented by the server 10 and the user terminal 20 are described.

[2-1-1. Functions to be Implemented by Server]

In the server 10, the data storage unit 100 and the authentication module 102 are implemented. In the second embodiment as well, although not shown in FIG. 14, the identification information acquisition module 101, the possibility determination module 103, the restriction module 104, the notification module 105, and the exclusion module 106 described in the first embodiment may be implemented.

For example, the data storage unit 100 has the same function as the function described in the first embodiment, and is configured to store the user database DB, the authentication terminal list L1, and the approaching user list L2.

The authentication module 102 also has the same function as the function described in the first embodiment. In the second embodiment, it is assumed that the second wireless communication unit 23B is in the off state when the user approaches the authentication terminal 30, and therefore the authentication module 102 performs authentication based on the communication content between the second wireless communication unit 23B, which is switched from the off state to the on state by a switching module 209, and the authentication terminal 30. The details of the authentication processing are as described in the first embodiment.

The "off" state is a state in which the wireless communication function is disabled. In the "off" state, power is not supplied to the second wireless communication unit 23B, and the power is turned off. The "on" state is a state in which the wireless communication function is enabled. In the "on" state, power is supplied to the second wireless communication unit 23B, and the power is turned on. Switching between the off state and the on state can be performed by the user performing a predetermined operation on the user terminal 20.

The authentication in the second embodiment may be implemented by processing different from that in the first embodiment. For example, in the second embodiment, authentication information may be transmitted from the user terminal 20 to the authentication terminal 30 when the user approaches the authentication terminal 30. In this case, the authentication module 102 may perform authentication based on the authentication information acquired from the user terminal 20 via the authentication terminal 30. The method of determining the success or failure of the authentication is as described in the first embodiment.

[2-1-2. Functions to be Implemented by User Terminal]

In the user terminal 20, a data storage unit 200, a position information acquisition module 207, a place information acquisition module 208, and the switching module 209 are implemented. In the second embodiment as well, although not shown in FIG. 14, the approach determination module 203, the identification information transmission module 204, the leaving determination module 205, and the notification transmission module 206 described in the first embodiment may also be implemented. For example, the data storage unit 200 has the same function as the function described in the first embodiment, and is configured to store the authentication terminal list L1.

[Position Information Acquisition Module]

The position information acquisition module 207 is mainly implemented by the control unit 21. The position information acquisition module 207 is configured to acquire position information on the position of the second wireless communication unit 23B. The position information may be any information capable of identifying the position of the second wireless communication unit 23B. For example, the position information may be the position of the user terminal 20 including the second wireless communication unit 23B. When the second wireless communication unit 23B is present in a different housing from the user terminal 20, the position information may be the position of the different housing.

In this embodiment, there is described a case in which the function of the position information acquisition module 207 is the same as the function of the first acquisition module 201 of the first embodiment. Therefore, the user terminal position information described in the first embodiment corresponds to the position information in the second embodiment. The method of acquiring the position information by the position information acquisition module 207 is the same as that described for the first acquisition module 201 in the first embodiment, and "first acquisition module 201 in the first embodiment" may be read as "position information acquisition module 207". For example, the position information acquisition module 207 acquires position information based on a signal received by the GPS receiving unit 26.

[Place Information Acquisition Module]

The place information acquisition module 208 is mainly implemented by the control unit 21. The place information acquisition module 208 is configured to acquire place information on a switching place of switching the energized state of the second wireless communication unit 23B.

The switching place is a place at which the second wireless communication unit 23B is to be switched from the on state to the off state, or a place at which the second wireless communication unit 23B is to be switched from the off state to the on state. For example, a place at which communication by the second wireless communication unit 23B is required, such as the vicinity of the authentication terminal 30, the home of the user, the workplace of the user, or the vicinity of a communication device to which the second wireless communication unit 23B has communicated, corresponds to the place at which the second wireless communication unit 23B is to be switched from the off state to the on state. Further, for example, a place at which communication by the second wireless communication unit 23B is to be refrained from, such as a place away from the authentication terminal 30, a public facility, public transportation, an airplane, or a hospital, corresponds to the place at which the second wireless communication unit 23B is to be switched from the on state to the off state.

The energized state is the presence or absence of a power supply to the circuit of the second wireless communication unit 23B, and indicates whether the second wireless communication unit 23B is ON or OFF. Changing from the on state to the off state or changing from the off state to the on state corresponds to switching the energized state. In other words, switching the switch suppling power to the circuit of the second wireless communication unit 23B corresponds to switching the energized state.

The place information may be any information capable of identifying the switching place, and may be, for example, information on the position of the switching place or information on the area of the switching place. The area is a rough position of the switching place, and has a certain size. For example, the area may be indicated by a range having a predetermined shape indicating the switching place, and may be a city name, an area, a postal code, a station name, an airport name, or a stop name, or an area on a map or coordinates on which latitude and longitude information or coordinate information is plotted.

In this embodiment, as an example, there is described a case in which the switching place is in the vicinity (communicable area A1) of the authentication terminal 30, and the place information is the authentication terminal position information. Therefore, there is described a case in which the function of the place information acquisition module 208 is the same as the function of the second acquisition module 202 of the first embodiment. The method of acquiring the place information by the place information acquisition module 208 is the same as that described for the second acquisition module 202 in the first embodiment, and "second acquisition module 202" in the first embodiment may be read as "place information acquisition module 208".

[Switching Module]

The switching module 209 is mainly implemented by the control unit 21. The switching module 209 is configured to switch the energized state of the second wireless communication unit 23B based on the position information and the place information.

"Switching" means changing the second wireless communication unit 23B from the on state to the off state, or changing the second wireless communication unit 23B from the off state to the on state. In other words, changing the energized state of the second wireless communication unit 23B corresponds to switching the energized state of the second wireless communication unit 23B. In this embodiment, there is described a case in which the switching module 209 switches the second wireless communication unit 23B from the off state to the on state. However, the switching module 209 may also switch the second wireless communication unit 23B from the on state to the off state.

The switching module 209 switches the energized state by controlling a switch in the circuit of the second wireless communication unit 23B. The switch is a switch for causing power from the power supply of the user terminal 20 to be conducted to the circuit of the second wireless communication unit 23B. The switching module 209 turns on the second wireless communication unit 23B by transmitting to the second wireless communication unit 23B a first command for turning on the switch, and turns off the second wireless communication unit 23B by transmitting to the second wireless communication unit 23B a second command for turning off the switch.

The switching module 209 determines whether or not the user is at the switching place or in the vicinity of the switching place based on the position information and the place information. The switching module 209 does not switch the energized state of the second wireless communication unit 23B when it is not determined that the user is at the switching place or in the vicinity of the switching place, and switches the energized state of the second wireless communication unit 23B when it is determined that the user is at the switching place or in the vicinity of the switching place.

In this embodiment, the "place information" indicates the position of the switching place, and therefore the switching module 209 determines whether or not a distance between the position indicated by the position information and the position indicated by the place information is less than a threshold value. For example, when the position information and the place information are indicated by latitude and longitude information or coordinate information, the switching module 209 calculates the distance based on the latitude and longitude information or coordinate information.

For example, the switching module 209 switches the energized state of the second wireless communication unit 23B when it is determined that the calculated distance is less than the threshold value. In other words, the switching module 209 switches the energized state of the second wireless communication unit 23B on condition that the distance is less than the threshold value. The switching module 209 switches the energized state of the second wireless communication unit 23B when the distance changes from a state equal to or more than the threshold value to a state less than the threshold value.

When the second wireless communication unit 23B of this embodiment is in the on state, the second wireless communication unit 23B can shift to an idle state different from the off state. The switching module 209 switches the wireless communication unit from the off state to on state based on the position information and the place information.

The idle state is a state in which the circuit of the second wireless communication unit 23B is energized, but the function of the circuit is more restricted than that in the on state. The idle state consumes less power than the on state. For example, in the idle state, communication to and from another device is performed less frequently than in the on state. Moreover, for example, in the idle state, the communication amount to and from another device is smaller than that in the on state. For example, in the idle state, the communication speed to and from another device is slower than that in the on state.

In this embodiment, the authentication terminal 30 is arranged at the switching place, and the switching module 209 switches the second wireless communication unit 23B from the off state to the on state when the second wireless communication unit 23B approaches the authentication terminal 30. The meaning of approaching the authentication terminal 30 is the same as that described in the first embodiment, and here means entering the communicable area A1. The switching module 209 switches the second wireless communication unit 23B from the off state to the on state when the second wireless communication unit 23B enters the communicable area.

2-2. Processing to be Executed in Second Embodiment

Figure 15:
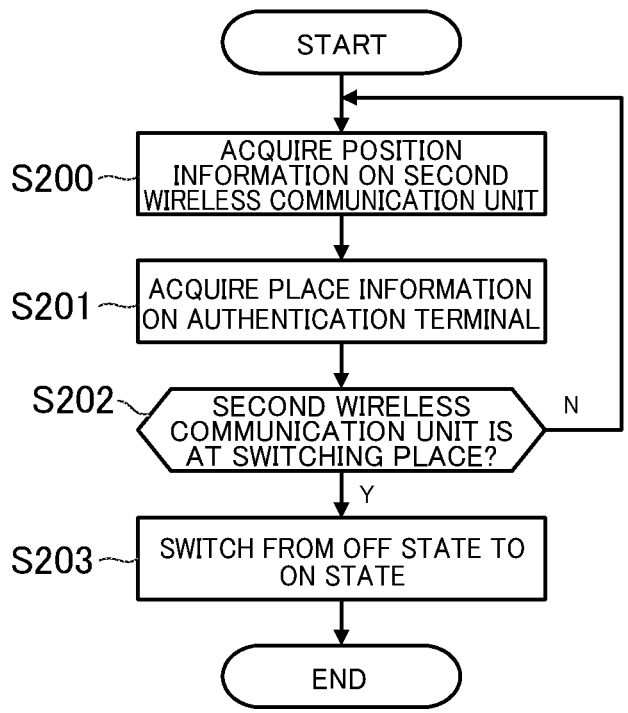
FIG. 15 is a flowchart for illustrating processing to be executed in the second embodiment.

FIG. 15 is a flowchart for illustrating processing to be executed in the second embodiment. In the second embodiment as well, the same processing as in the first embodiment may be executed, and when the second wireless communication unit 23B is in the off state, the processing described below is executed. The processing illustrated in FIG. 15 is executed by the control unit 21 operating in accordance with programs stored in the storage unit 22. The processing described below is an example of processing to be executed by the functional blocks illustrated in FIG. 14.

First, as illustrated in FIG. 15, in the user terminal 20, the control unit 21 acquires position information on the second wireless communication unit 23B based on a signal received by the GPS receiving unit 26 (Step S200). The processing of Step S200 is the same as that of Step S100 and Step 121.

The control unit 21 refers to the authentication terminal list L1 stored in the storage unit 22, and acquires the place information on the authentication terminal 30 (Step S201). In Step S201, the control unit 21 refers to the place information stored in the authentication terminal list L1.

The control unit 21 determines whether or not the second wireless communication unit 23B is at the switching place based on the position information acquired in Step S200 and the place information acquired in Step S201 (Step S202). The processing of Step S202 is the same as the processing of Step S101.

When it is not determined that the second wireless communication unit 23B is at the switching place (Step S202: N), the processing returns to Step S200. Meanwhile, when it is determined that the second wireless communication unit 23B is at the switching place (Step S202: Y), the control unit 21 switches the second wireless communication unit 23B from the off state to the on state (Step S203), and the processing ends. In Step S203, the control unit 21 transmits to the second wireless communication unit 23B a command to turn on a switch for energizing the circuit. The second wireless communication unit 23B is then turned on, and the processing from Step S102 and the subsequent steps described in the first embodiment is executed.

According to the second embodiment described above, through switching the energized state of the second wireless communication unit 23B based on position information and place information, the second wireless communication unit 23B can be automatically turned on only when the second wireless communication unit 23B is required, and power consumption can be suppressed without requiring time and effort by the user. For example, the user turns off the wireless communication unit 23B when the user is not required to use the second wireless communication unit 23B. When the user approaches a switching place at which the user wishes to use the second wireless communication unit 23B, the second wireless communication unit 23B is set to turn on automatically. As a result, the user is not required to perform an operation to turn on the second wireless communication unit 23B. Moreover, for example, the user keeps the second wireless communication unit 23B on when the user is at a place away from a switching place at which use of the second wireless communication unit 23B is to be restricted, and the second wireless communication unit 23B automatically turns off when the user approaches the switching place. Therefore, the user is not required to perform an operation of turning off the second wireless communication unit 23B.

Moreover, through acquiring the position information based on signals received by the GPS receiving unit for receiving signals from satellites, the fact that the user is at the switching place can be accurately identified, and the energized state of the second wireless communication unit 23B can be switched. For example, the position information can be acquired by another means even when the second wireless communication unit 23B is in the off state.

Moreover, whether or not the distance between the position indicated by the position information and the position indicated by the place information is less than a threshold value is determined. When it is determined that the distance is less than the threshold value, through switching the energized state of the second wireless communication unit 23B, it is possible to accurately identify that the second wireless communication unit 23B is at the switching place, and the energized state of the second wireless communication unit 23B can be switched.

Moreover, in the on state, by switching the second wireless communication unit 23B, which is capable of shifting to an idle state different from the off state, from the off state to the on state, it is possible to suppress power consumption more than in the idle state.

Moreover, the authentication terminal 30 is arranged at the switching place, and authentication is performed when the second wireless communication unit 23B switches from the off state to the on state, to thereby save the user's time and effort and suppress power consumption during authentication.

3. Modification Examples

Embodiments of the present invention is not limited to the embodiments described above, and can be modified suitably without departing from the spirit of the embodiments of the present invention.

3-1. Modification Examples of First Embodiment (1-1) First, modification examples of the first embodiment are described. For example, in the first embodiment, there is described a case in which the presence or absence of the possibility of impersonation is determined based on the number of pieces of registered authentication information matching or similar to the acquired authentication information. However, the method of determining the presence or absence of the possibility of impersonation is not limited to the example described in the first embodiment.

The possibility determination module 103 of this modification example may determine whether or not there is the possibility of impersonation by mutually comparing the authentication information registered for each of the plurality of users in the vicinity of the authentication terminal 30.

The method of acquiring the registered authentication information is the same as that described in the first embodiment. The possibility determination module 103 may refer to the user database DB and the approaching user list L2, and acquire the authentication information associated with the user ID of each of the plurality of users in the vicinity of the authentication terminal 30.

The possibility determination module 103 does not determine that there is the possibility of impersonation when the registered authentication information on the plurality of users in the vicinity of the authentication terminal 30 does not match or is not similar to each other, and determines that there is the possibility of impersonation when the registered authentication information on those users matches or is similar to each other. In other words, the possibility determination module 103 does not determine that there is the possibility of impersonation when there is no combination of pieces of authentication information that are matching or similar to each other, and determines that there is the possibility of impersonation when there is one or more combinations of pieces of authentication information that are matching or similar to each other.

In the first embodiment, whether or not there is the possibility of impersonation is determined based on the processing of Step S114 illustrated in FIG. 13. However, in this modification example, before the processing of Step S114 is executed, whether or not there is the possibility of impersonation is determined by mutually comparing the authentication information on each of the plurality of users in the vicinity of the authentication terminal 30. Moreover, for example, whether or not there is the possibility of impersonation may also be determined by, before the user touches the button B35, referring to the approaching user list L2 and mutually comparing pieces of authentication information on the users having user IDs stored in the approaching user list L2.

According to Modification Example (1-1) of the present invention, the presence or absence of the possibility of impersonation can be accurately determined by mutually comparing the authentication information registered for each of the plurality of users in the vicinity of the authentication terminal 30, and determining that there is the possibility of impersonation. Further, the determination of the possibility of impersonation can be executed at an earlier stage because authentication information acquired by using the authentication terminal 30 is not referred to in order to determine the possibility of impersonation. As a result, the authentication restriction notification can be displayed on the authentication terminal 30 at an early stage before the user touches the button B35. The user knows at an early stage that successful authentication is to be restricted, and can urge another nearby user to move away from the authentication terminal 30. As a result, user's convenience can be improved. Moreover, when the button B35 is touched, there is a possibility that the processing load on the server 10 increases because the feature amount of the face is required to be calculated from the image photographed by the photographing unit 36, and processing of comparing the acquired authentication information and the registered authentication information is required to be executed. However, through determining the possibility of impersonation in advance and restricting successful authentication, it is not required to execute those processes, and the processing load on the server 10 can be reduced.

(1-2) Moreover, for example, in a case in which the photographing unit 36 of the authentication terminal 30 has photographed the face of the user, when the face of another user in the vicinity is also photographed, whether or not there is a user having a similar face can be determined by comparing the faces photographed in the image. Therefore, the possibility determination module 103 may determine whether or not there is the possibility of impersonation by mutually comparing the authentication information on each of the plurality of users in the vicinity of the authentication terminal 30 acquired by using the authentication terminal 30.

The possibility determination module 103 does not determine that there is the possibility of impersonation when the acquired authentication information on each of the plurality of users in the vicinity of the authentication terminal 30 does not match or is not similar to each other, and determines that there is the possibility of impersonation when the acquired authentication information on those users matches or is similar to each other. In other words, the possibility determination module 103 does not determine that there is the possibility of impersonation when there is no combination of pieces of authentication information that are matching or similar to each other, and determines that there is the possibility of impersonation when there is one or more combinations of pieces of authentication information that are matching or similar to each other.

In the first embodiment, whether or not there is the possibility of impersonation is determined based on the processing of Step S114 illustrated in FIG. 13. However, in this modification example, before the processing of Step S114 is executed, whether or not there is the possibility of impersonation is determined by mutually comparing the acquired authentication information on each of the plurality of users in the vicinity of the authentication terminal 30. This processing may be executed by the server 10 or by the authentication terminal 30. When the presence or absence of the possibility of impersonation is determined by the authentication terminal 30, it is possible to determine whether or not successful authentication is to be restricted without transmitting an image or the like to the server 10.

According to Modification Example (1-2) of the present invention, the presence or absence of the possibility of impersonation can be accurately determined by comparing the acquired authentication information on each of a plurality of users in the vicinity of the authentication terminal 30 with each other. In addition, the authentication information registered in the server 10 is not referred to in order to determine the possibility of impersonation, and therefore the determination as to the possibility of impersonation can be executed at an earlier stage. As a result, the authentication restriction notification can be displayed on the authentication terminal 30 at an earlier stage. The user knows at an early stage that successful authentication is to be restricted, and can urge another nearby user to move away from the authentication terminal 30. Asa result, user's convenience can be improved. Moreover, there is a possibility that the processing load on the server 10 increases when the server 10 calculates the feature amount of the face from the image photographed by the photographing unit 36 and executes processing of comparing the acquired authentication information and the registered authentication information. However, through determining the possibility of impersonation in advance on the authentication terminal 30 side and restricting successful authentication, it is not required to execute those processes, and the processing load on the server 10 can be reduced.

(1-3) Moreover, for example, in the first embodiment, as an example, there is described a case in which the user passes through the security gate SG, but the authentication system S can be used in any situation. For example, the authentication system S can be used in a situation in which a service is provided. The service may be any service, such as a sales service of a product, a food and drink provision service, a beauty service such as a haircut or a beauty salon, a financial service, or an insurance service.

The restriction module 104 restricts provision of the service using the authentication terminal 30 by restricting successful authentication when it is determined by the possibility determination module 103 that there is the possibility of impersonation. Restricting provision of a service refers to not executing information processing for providing the service, for example, not executing payment processing and not displaying a message "Thank you" or the like displayed when the product is purchased.

In this modification example, for example, the authentication terminal 30 is a vending machine, a ticket machine, a POS terminal, or a payment terminal in a shop. When the user faces the photographing unit 36 of the authentication terminal 30 and face authentication is successful, payment processing is executed, and the user can purchase the product or use the service. For example, when face authentication is successful, the server 10 may execute payment processing based on payment information on the user for which face authentication has been successful. The payment information referred to during payment processing is payment information associated with the user for which face authentication has been successful.

The payment information is information required in order to perform payment, such as credit card information, electronic value (e.g., electronic money or points) account information, virtual currency account information, bank account information, or debit card information. It is assumed that the payment information is registered during user registration, and is stored in the user database DB in association with the user ID, for example. The payment information may be stored in a database different from the user database DB.

It is sufficient for the server 10 to execute payment processing corresponding to the payment information. For example, the server 10 executes credit processing based on credit card information, processing of decreasing an electronic value balance, processing of decreasing a virtual currency balance, processing of debiting and transferring from a bank account, or processing of decreasing the balance of the account indicated by debit card information. The server 10 does not execute payment processing when there are a plurality of users having a similar face to each other in the vicinity of the authentication terminal 30, and executes payment processing when there is not a plurality of users having a similar face to each other and authentication has been successful.

When payment processing has been executed, that fact is displayed on the display unit 35 of the authentication terminal 30 or a terminal of the shop, and the user receives the product or uses the service. For example, in a case in which the authentication terminal 30 is a digital signage device installed in a shop or the like, when an authentication success notification is received from the server 10, a message indicating that the authentication has been successful is displayed on the display unit 35. When a shop staff member confirms the message, the staff member hands over the product or provides the service to the user. In place of the authentication terminal 30, the message may be transferred to another computer, such as a terminal operated by the shop staff member, to be displayed. As another example, in a case in which the authentication terminal 30 is a vending machine, when an authentication success notification is received from the server 10, the authentication terminal 30 discharges the product specified by the user or prepares a product such as coffee or instant food.

According to Modification Example (1-3), security at the time of purchasing a product or using a service can be sufficiently enhanced by preventing another user having a similar face from improperly purchasing a product or using a service by impersonating the user and paying. Further, from the viewpoint of the user, user's convenience can be improved because it is possible to perform payment in a secure manner even when the user is only carrying the user terminal 20 and is not carrying his or her wallet, and from the viewpoint of the shop, shop's convenience can be improved because payment is possible without requiring a dedicated device, for example, a credit card reader, to be installed.

(1-4) Moreover, for example, the second wireless communication unit 23B may use a communication standard other than Bluetooth (trademark). For example, the second wireless communication unit 23B may use Wi-Fi. In this case, the authentication terminal 30 cannot spontaneously acquire the wireless communication ID of the users in the vicinity of the authentication terminal 30, and therefore whether or not there is a user in the vicinity of the authentication terminal 30 may be determined by the user terminal 20.

Figure 16:
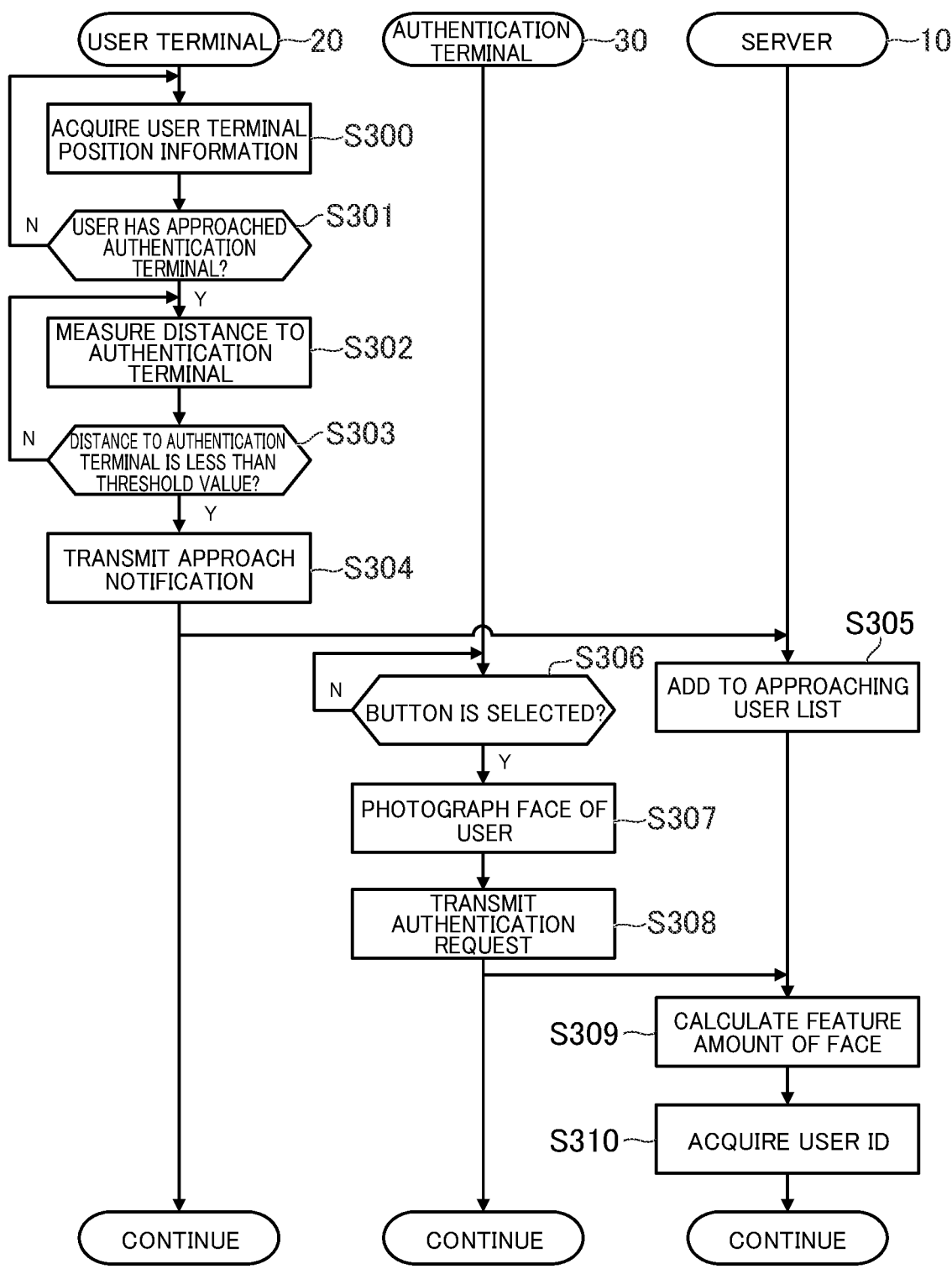
FIG. 16 is a flowchart for illustrating a case in which a second wireless communication unit uses Wi-Fi.

FIG. 16 and FIG. 17 are flowcharts for illustrating a case in which the second wireless communication unit 23B uses Wi-Fi. The processing illustrated in FIG. 16 and FIG. 17 is executed by the control units 11, 21, and 31 operating in accordance with the programs stored in the storage units 12, 22, and 32, respectively.

As illustrated in FIG. 16, the processing of Step S300 and Step S301 is the same as the processing of Step S100 and Step S101. When it is determined that the user has approached the authentication terminal 30 (Step S301: Y), the control unit 21 scans the strength (RSSI) of the signal received by the second wireless communication unit 23B, and measures the distance to the authentication terminal 30 (Step S302). The processing of Step S302 is the same as the processing of Step S107, except that Bluetooth (trademark) signal strength is used in Step S107, whereas Wi-Fi signal strength is used in Step S302.

The control unit 21 determines whether or not the distance to the authentication terminal 30 is less than a threshold value (Step S303). In Step S303, the control unit 21 determines whether or not the user is in the authentication-feasible area A2.

When it is not determined that the distance to the authentication terminal 30 is equal to or more than the threshold value (Step S303: N), the processing returns to Step S302. Meanwhile, when it is determined that the distance to the authentication terminal 30 is less than the threshold value (Step S303: Y), the control unit 21 uses the first wireless communication unit 23A to transmit an approach notification to the server 10 (Step S304). The processing of Step S304 is the same as the processing of Step S102, but there is a difference in that in Step S102 the approach notification is transmitted when the user enters the communicable area A1, whereas in Step S304 the approach notification is transmitted when the user enters the authentication-feasible area A2.

The subsequent processing of Step S305 to Step S308 is the same as the processing of Step S103, Step S104, Step S109, and Step S110. However, the authentication terminal 30 of this modification example does not acquire the wireless communication ID of the second wireless communication unit 23B of the user terminal 20, and therefore the authentication request transmitted in Step S308 does not include the wireless communication ID. That is, the authentication request transmitted in Step S308 includes only the authentication terminal ID and the image photographed by the photographing unit 36.

The subsequent processing of Step S309 to Step S322 is the same as the processing of Step S111 to Step S124. However, there is a difference in that in Step S112, the authentication terminal ID included in the authentication request and the user ID associated with the wireless communication ID are acquired from the approaching user list L2, whereas in Step S310 the user ID associated with the authentication terminal ID included in the authentication request is referred to from the approaching user list L2. In Step S320, the control unit 21 determines whether or not the user is in the authentication-feasible area A2.

According to Modification Example (1-4) of the present invention, impersonation can be prevented to enhance security even in the case of using a communication standard, for example Wi-Fi, in which it is not possible on the authentication terminal 30 side to calculate the distance to the user terminal 20.

3-2. Modification Examples of Second Embodiment (2-1) Next, modification examples of the second embodiment are described. In the second embodiment, there is described a case in which the determination as to whether or not the user is at the switching place is performed based on the signals received by the GPS receiving unit 26, but the method of determining whether or not the user is at the switching place is not limited to a method using the GPS receiving unit 26.

For example, when the user terminal 20 includes the second wireless communication unit 23B and the first wireless communication unit 23A, which is another wireless communication unit different from the second wireless communication unit 23B, the position information acquisition module 207 may acquire the position information based on the communication content of the first wireless communication unit 23A, which is the another wireless communication unit. In this modification example, the position information is access point information, beacon information, or mobile base station information, and the place information is the identification information on the access point, beacon, or mobile base station at the authentication terminal 30 or in the vicinity of the authentication terminal 30.

The switching module 209 determines whether or not the user is at the switching place or in the vicinity of the switching place by determining whether or not the access point information, beacon information, or mobile base station information indicated by the position information and the access point information, beacon information, or mobile base station information indicated by the place information match. The switching module 209 does not determine that the user is at the switching place or in the vicinity of the switching place when there is no match, and determines that the user is at the switching place or in the vicinity of the switching place when there is a match. The processing after the user is determined to be at the switching place or in the vicinity of the switching place is as described in the second embodiment.

According to Modification Example (2-1) of the present invention, the user can be accurately identified as being at the switching place by acquiring the position information based on the communication content of the first wireless communication unit 23A, which is another wireless communication unit different from the second wireless communication unit 23B, and the energized state of the second wireless communication unit 23B can be switched. For example, the position information can be acquired by another means even when the second wireless communication unit 23B is in the off state.

(2-2) Moreover, for example, the place information may indicate a switching place area having a fixed size in place of pinpointing the position of the switching place.

The switching module 209 determines whether or not the position indicated by the position information is included in the area indicated by the place information. For example, when the position information is latitude and longitude information or coordinate information, the place information indicates an area having a fixed size set on a map or in an n-dimensional space (n is a numerical value indicating the number of dimensions of the coordinate information). The switching module 209 determines whether or not the user is at the switching place or in the vicinity of the switching place by determining whether or not the latitude and longitude information or the coordinate information on the position of the second wireless communication unit 23B is included in the area on the map or in the n-dimensional space.

The switching module 209 switches the energized state of the second wireless communication unit 23B when it is determined that the position indicated by the position information is included in the area indicated by the place information. For example, the switching module 209 switches the second wireless communication unit 23B from the on state to the off state when it is determined that the position indicated by the position information is included in the area indicated by the place information. As another example, the switching module 209 switches the second wireless communication unit 23B from the off state to the on state when it is determined that the position indicated by the position information is included in the area indicated by the place information.

According to Modification Example (2-2), it is determined whether or not the position indicated by the position information is included in the area indicated by the place information, and when it is determined that the position is included, the energized state of the second wireless communication unit 23B is switched. Through switching the energized state, it is possible to accurately identify that the user is at the switching place and to switch the energized state of the second wireless communication unit 23B.

(2-3) Moreover, for example, when the user moves out of the switching place after having moved to the switching place, the second wireless communication unit 23B may be returned to its original state.

The switching module 209 determines whether the user has moved away from the switching place based on the position information and the place information. For example, when the place information indicates the position of the switching place, the switching module 209 determines whether or not the user has moved away from the switching place by determining whether or not the distance between the position indicated by the position information and the position indicated by the place information has changed from a state less than a threshold value to a state equal to or more than the threshold value. Moreover, for example, when the place information indicates the area of the switching place, the switching module 209 determines whether or not the user has moved away from the switching place by determining whether or not the position indicated by the position information has changed from a state of being included in the area indicated by the place information to a state of not being included in the area indicated by the place information.

For example, the switching module 209 switches the second wireless communication unit 23B from the off state to the on state when the second wireless communication unit 23B has approached the switching place, and switches the second wireless communication unit 23B from the on state to the off state when the second wireless communication unit 23B has moved away from the place.

Moreover, for example, the switching module 209 switches the second wireless communication unit 23B from the on state to the off state when the second wireless communication unit 23B has approached the switching place, and switches the second wireless communication unit 23B from the off state to the on state when the second wireless communication unit 23B has moved away from the switching place.

According to Modification Example (2-3), when the second wireless communication unit 23B has moved away from the switching place, power consumption can be suppressed without requiring time and effort by the user by returning the second wireless communication unit 23B to its original state.

(2-4) Moreover, for example, a wireless communication system of the second embodiment is applicable in any situation, and may be applied in a system other than the authentication system S. For example, when the switching place is in an airplane, the wireless communication system may switch the second wireless communication unit 23B from the on state to the off state when the user gets on the airplane. As another example, the wireless communication system may switch the second wireless communication unit 23B from the off state to the on state when the user gets off the airplane. Further, for example, when the switching place is a movie theater or an examination hall, the wireless communication system may switch the second wireless communication unit 23B from the on state to the off state when the user enters the movie theater or the examination hall. As another example, the wireless communication system may switch the second wireless communication unit 23B from the off state to the on state when the user leaves the movie theater or the examination hall.

Moreover, for example, the user may specify the switching place. For example, the user may specify his or her home, workplace, or the like as the switching place. Further, for example, the position information may be acquired based on the communication content of the second wireless communication unit 23B. In this case, the switching module 209 switches the second wireless communication unit 23B from the on state to the off state based on the communication content of the second wireless communication unit 23B when the second wireless communication unit 23B is in the on state. Further, for example, the switching module 209 may switch the energized state of the first wireless communication unit 23A in place of the second wireless communication unit 23B.

3-3. Other Modification Examples (3) Further, for example, the above-mentioned modification examples may be combined.

Moreover, for example, the photographing unit 36 may perform photography without any particular operation by the user in place of performing photography when the user touches the button B35. The photographing unit 36 may also perform continuous photography based on a predetermined frame rate. Further, for example, the photographing unit 36 may photograph the face of the user when the user makes a predetermined sound or performs a predetermined gesture. In addition, for example, there has been described a case in which the user terminal 20 and the authentication terminal 30 are not paired, but those terminals may be paired.

Moreover, for example, there has been described a case in which biometric authentication is executed based on an image photographed by the photographing unit 36 of the authentication terminal 30, but biometric authentication may be executed by using another sensor such as an infrared sensor or an ultrasonic sensor. The authentication system S may include a sensor corresponding to the biometric authentication to be used. Further, for example, authentication other than biometric authentication may be used. For example, the user may input a password to the authentication terminal 30. In this case, it is possible to prevent impersonation when there are a plurality of users using the same password as each other in the vicinity of the authentication terminal 30.

Moreover, for example, each function may be shared by a plurality of computers. For example, functions may be shared among the server 10, the user terminal 20, and the authentication terminal 30. For example, the authentication processing may be executed by the user terminal 20 or the authentication terminal 30 in place of the server 10. Further, for example, when the authentication system S includes a plurality of server computers, the functions may be shared by those plurality of server computers. In addition, for example, the data described as being stored in the data storage unit 100 may be stored by a computer other than the server 10.

The invention claimed is:

1. An authentication system, comprising at least one memory configured to store computer program code; and
    at least one processor configured to operate as instructed by the computer program code, the computer program code including:
        first authentication code configured to cause the at least one processor to perform authentication of a user in a vicinity of an authentication terminal based on first authentication information acquired by using the authentication terminal and second authentication information registered in a storage in association with identification information on the user, wherein performing authentication includes calculating a feature amount of the user's face, the feature amount indicates features including a relative position, size, or shape of a facial part, the first authentication information is the feature amount acquired by using the authentication terminal, and the second authentication information is the feature amount registered in the storage in association with the identification information on the user;
        determining code configured to cause the at least one processor to determine, when there are the user and another user who is different from the user in the vicinity of the authentication terminal, a possibility of the user being authenticated as the another user, by comparing the second authentication information of the user and the second authentication information of the another user; and
        second authentication code configured to cause the at least one processor to prevent the execution of the first authentication code, when the determining code determines that there is the possibility.

2. The authentication system according to claim 1, wherein the second authentication code is further configured to cause the at least one processor to permit the successful authentication when, after the successful authentication has been prevented, the determining code does not determine that there is the possibility.

3. The authentication system according to claim 1, wherein the program code further includes notification code configured to cause the at least one processor to issue a predetermined notification to at least one of the user and the another user when the determining code determines that that there is the possibility.

4. The authentication system according to claim 1,
wherein the program code further includes acquiring code configured to cause the at least one processor to acquire the identification information from a user terminal that has approached the authentication terminal, and
wherein the acquiring code is configured to cause the at least one processor to acquire the second authentication information to perform the authentication based on the identification information acquired from the user terminal.

5. The authentication system according to claim 4, wherein the at least one does not perform the second authentication code when the user terminal that has approached the authentication terminal subsequently moves away from the authentication terminal.

6. The authentication system according to claim 1,
wherein the authentication system comprises the user terminal, and
wherein the user terminal is configured to:
acquire authentication terminal position information on a position of the authentication terminal;
acquire user terminal position information including a position of itself;
determine, based on the authentication terminal position information and the user terminal position information, whether the user terminal has approached the authentication terminal; and
transmit the identification information when the user terminal determines that the user terminal has approached the authentication terminal.

7. The authentication system according to claim 6,
wherein the user terminal is configured to:
determine, based on the authentication terminal position information and the user terminal position information, whether the user terminal has moved away from the authentication terminal; and
transmit a predetermined notification when the user terminal determines that the user terminal has moved away from the authentication terminal, and
wherein the at least one processor is configured to exclude, when the predetermined notification is received, the registered authentication information such that the registered authentication information is not used in the authentication.

8. The authentication system according to claim 1,
wherein the determining code is further configured to cause the at least one processor to determine, based on communication content of short-range wireless communication performed between the authentication terminal and a user terminal by using a wireless communication ID acquired from the user terminal, whether there is a user in the vicinity of the authentication terminal, and
determine the possibility when the determining code determines that there are the user and the another user in the vicinity of the authentication terminal based on the communication content of the short-range wireless communication.

9. The authentication system according to claim 8,
wherein in the short-range wireless communication, a distance between the authentication terminal and the user terminal is measurable, and
wherein the determination code is further configured to cause the at least one processor to determine whether there is a user in the vicinity of the authentication terminal based on the distance measured by the short-range wireless communication.

10. The authentication system according to claim 1, wherein the second authentication code is further configured to cause the at least one processor to perform the authentication based on biometric authentication information acquired by using the authentication terminal and the registered biometric authentication information.

11. The authentication system according to claim 1, wherein preventing successful authentication further includes restricting provision of a service that uses the authentication terminal.

12. An authentication method, comprising:
performing authentication of a user in a vicinity of an authentication terminal based on first authentication information acquired by using an authentication terminal and second authentication information registered in a storage in association with identification information on the user, wherein performing authentication includes calculating a feature amount of the user's face, the feature amount indicates features such as a relative position, size, or shape of a facial part, the first authentication information is the feature amount acquired by using the authentication terminal, and the second authentication information is the feature amount registered in the storage in association with the identification information on the user;
determining, when there are the user and another user who is different from the user in the vicinity of the authentication terminal, a possibility of the user being authenticated as the another user, by comparing the second authentication information of the user and the second authentication information of the another user; and
prevent the execution of the authentication when the authentication method determines that there is the possibility.

13. An authentication system, comprising at least one memory configured to store computer program code; and
at least one processor configured to operate as instructed by the computer program code, the computer program code including:
first authentication code configured to cause the at least one processor to perform authentication of a user in a vicinity of an authentication terminal based on first authentication information acquired by using the authentication terminal and second authentication information registered in a storage in association with identification information on the user, wherein performing authentication includes calculating a feature amount of the user's face, the feature amount indicates features including a relative position, size, or shape of a facial part, the first authentication information is the feature amount acquired by using the authentication terminal, and the second authentication information is the feature amount registered in the storage in association with the identification information on the user;

determining code configured to cause the at least one processor to determine, when there are the user and another user who is different from the user in the vicinity of the authentication terminal, a possibility of the user being authenticated as the another user, by comparing the first authentication information of the user and the first authentication information of the another user; and second authentication code configured to cause the at least one processor to prevent the execution of the first authentication code, when the determining code determines that there is the possibility.

14. An authentication method, comprising:

performing authentication of a user in a vicinity of an authentication terminal based on first authentication information acquired by using an authentication terminal and second authentication information registered in a storage in association with identification information on the user, wherein performing authentication includes calculating a feature amount of the user's face, the feature amount indicates features including a relative position, size, or shape of a facial part, the first authentication information is the feature amount acquired by using the authentication terminal, and the second authentication information is the feature amount registered in the storage in association with the identification information on the user;

determining, when there are the user and another user who is different from the user in the vicinity of the authentication terminal, a possibility of the user being authenticated as the another user, by comparing the first authentication information of the user and the first authentication information of the another user; and prevent the execution of the authentication when the authentication method determines that there is the possibility.

* * * * *